(12) United States Patent
Raghavan et al.

(10) Patent No.: US 11,764,886 B2
(45) Date of Patent: Sep. 19, 2023

(54) ANTENNA PANEL SELECTION FOR INTERFERENCE MITIGATION AT A MULTI-PANEL DEVICE

(71) Applicant: QUALCOMM incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/462,723

(22) Filed: Aug. 31, 2021

(65) Prior Publication Data

US 2022/0077577 A1   Mar. 10, 2022

Related U.S. Application Data

(60) Provisional application No. 63/076,222, filed on Sep. 9, 2020.

(51) Int. Cl.
*H04B 17/345* (2015.01)
*H04B 17/382* (2015.01)

(52) U.S. Cl.
CPC ......... *H04B 17/345* (2015.01); *H04B 17/382* (2015.01)

(58) Field of Classification Search
CPC .. H04B 7/0617; H04B 7/0695; H04B 7/0408; H04B 7/0691; H04B 7/0842; H04B 7/0874; H04B 17/345; H04B 17/318; H04B 17/382; H04W 72/541; H04W 28/0236; H04W 52/0254; Y02D 30/70
See application file for complete search history.

(56) References Cited

U.S. PATENT DOCUMENTS

| | | | |
|---|---|---|---|
| 2016/0197659 A1* | 7/2016 | Yu | H04B 7/0617 370/335 |
| 2018/0026683 A1* | 1/2018 | Manholm | H04B 7/0695 375/267 |
| 2020/0382195 A1* | 12/2020 | Hur | H04W 16/28 |
| 2022/0263240 A1* | 8/2022 | Leather | H04B 7/0617 |

FOREIGN PATENT DOCUMENTS

WO   WO-2018228697 A1 * 12/2018

\* cited by examiner

*Primary Examiner* — Quoc Thai N Vu
(74) *Attorney, Agent, or Firm* — Holland & Hart LLP

(57) ABSTRACT

Methods, systems, and devices for wireless communications are described. In some systems, a multi-panel device may determine, for each antenna panel of the multi-panel device, a coverage region over which the multi-panel device may communicate using that antenna panel based on an array gain pattern of that antenna panel. For example, the multi-panel device may determine, for each antenna panel of the multi-panel device, a coverage region over which the multi-panel device may communicate using that antenna panel to avoid the formation of a grating lobe from that antenna panel. The multi-panel device may dynamically adjust the coverage regions associated with the antenna panels of the multi-panel device based on determining that an interference metric exceeds a threshold interference level or based on determining that a power or thermal condition of the multi-panel device fails to satisfy a power or thermal constraint of the multi-panel device.

28 Claims, 10 Drawing Sheets

ANTENNA PANEL SELECTION FOR INTERFERENCE MITIGATION AT A MULTI-PANEL DEVICE

CROSS REFERENCE

The present application for patent claims the benefit of U.S. Provisional Patent Application No. 63/076,222 by RAGHAVAN et al., entitled "ANTENNA PANEL SELECTION FOR INTERFERENCE MITIGATION AND POWER AND THERMAL MANAGEMENT AT A MULTI-PANEL DEVICE," filed Sep. 9, 2020, assigned to the assignee hereof, and expressly incorporated by reference herein.

TECHNICAL FIELD

The following relates to wireless communications, including antenna panel selection at a multi-panel device.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems, which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, some devices, such as base stations or UEs, may communicate using frequencies in an FR2 frequency band or an FR4 frequency band. In some cases, such frequencies may have a half wavelength that is less than an inter-element spacing of an antenna panel, which may result in the formation of grating lobes (for example, lobes that have an array gain of similar magnitude to a main lobe) if transmitting or receiving via the antenna panel over one or more angles. The presence of grating lobes may cause interference at other devices within the system, ambiguities in beam management, or poor beam design and functionality, among other issues.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication at a first device. The method may include determining a carrier frequency dependent multi-panel configuration associated with at least a first antenna panel and a second antenna panel, determining a first coverage region associated with the first antenna panel and a second coverage region associated with the second antenna panel based on a first grating lobe of a first array gain pattern of the first antenna panel and a second grating lobe of a second array gain pattern of the second antenna panel, the first grating lobe different than a main lobe of the first array gain pattern and the second grating lobe different than a main lobe of the second array gain pattern, and communicating with a second device using one of the first antenna panel or the second antenna panel based on a location of the second device being in the first coverage region associated with the first antenna panel or the second coverage region associated with the second antenna panel.

Another innovative aspect of the subject matter described in this disclosure can be implemented in an apparatus for wireless communication at a first device. The apparatus may include a processor, memory coupled with the processor, and instructions stored in the memory. The instructions may be executable by the processor to cause the apparatus to determine a carrier frequency dependent multi-panel configuration associated with at least a first antenna panel and a second antenna panel, determine a first coverage region associated with the first antenna panel and a second coverage region associated with the second antenna panel based on a first grating lobe of a first array gain pattern of the first antenna panel and a second grating lobe of a second array gain pattern of the second antenna panel, the first grating lobe different than a main lobe of the first array gain pattern and the second grating lobe different than a main lobe of the second array gain pattern, and communicate with a second device using one of the first antenna panel or the second antenna panel based on a location of the second device being in the first coverage region associated with the first antenna panel or the second coverage region associated with the second antenna panel.

Another innovative aspect of the subject matter described in this disclosure can be implemented in another apparatus for wireless communication at a first device. The apparatus may include means for determining a carrier frequency dependent multi-panel configuration associated with at least a first antenna panel and a second antenna panel, determining a first coverage region associated with the first antenna panel and a second coverage region associated with the second antenna panel based on a first grating lobe of a first array gain pattern of the first antenna panel and a second grating lobe of a second array gain pattern of the second antenna panel, the first grating lobe different than a main lobe of the first array gain pattern and the second grating lobe different than a main lobe of the second array gain pattern, and communicating with a second device using one of the first antenna panel or the second antenna panel based on a location of the second device being in the first coverage region associated with the first antenna panel or the second coverage region associated with the second antenna panel.

Another innovative aspect of the subject matter described in this disclosure can be implemented in a non-transitory computer-readable medium storing code for wireless communication at a first device. The code may include instructions executable by a processor to determine a carrier frequency dependent multi-panel configuration associated with at least a first antenna panel and a second antenna panel, determine a first coverage region associated with the first antenna panel and a second coverage region associated with the second antenna panel based on a first grating lobe of a first array gain pattern of the first antenna panel and a second grating lobe of a second array gain pattern of the second antenna panel, the first grating lobe different than a main lobe of the first array gain pattern and the second grating lobe different than a main lobe of the second array gain pattern, and communicate with a second device using one of the first antenna panel or the second antenna panel based on a location of the second device being in the first coverage region associated with the first antenna panel or the second coverage region associated with the second antenna panel.

Some examples of the method, apparatuses, and non-transitory computer-readable medium described herein may further include operations, features, means, or instructions for receiving, from a third device, an interference measurement report based on communicating with the second device using at least the first antenna panel within the first coverage region or the second antenna panel within the second coverage region, the interference measurement report including an interference metric associated with the first array gain pattern of the first antenna panel and the second array gain pattern of the second antenna panel.

Some examples of the method, apparatuses, and non-transitory computer-readable medium described herein may further include operations, features, means, or instructions for determining that the interference metric fails to satisfy a threshold, determining a third coverage region associated with the first antenna panel and a fourth coverage region associated with the second antenna panel based on determining that the interference metric fails to satisfy the threshold, the third coverage region different than the first coverage region and the fourth coverage region different than the second coverage region, and communicating with the second device using one of the first antenna panel or the second antenna panel based on the location of the second device being in the third coverage region associated with the first antenna panel or the fourth coverage region associated with the second antenna panel.

Some examples of the method, apparatuses, and non-transitory computer-readable medium described herein may further include operations, features, means, or instructions for transmitting, to the third device, a message triggering the interference measurement report. In such examples, receiving the interference measurement report may be based on transmitting the message.

Some examples of the method, apparatuses, and non-transitory computer-readable medium described herein may further include operations, features, means, or instructions for transmitting, to the third device, an acknowledgement (ACK) of receiving the interference measurement report.

In some examples of the method, apparatuses, and non-transitory computer-readable medium described herein, the interference metric may be based on an interference arising from the main lobe of the first array gain pattern, the first grating lobe of the first array gain pattern, the main lobe of the first array gain pattern, or the second grating lobe of the second array gain pattern.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
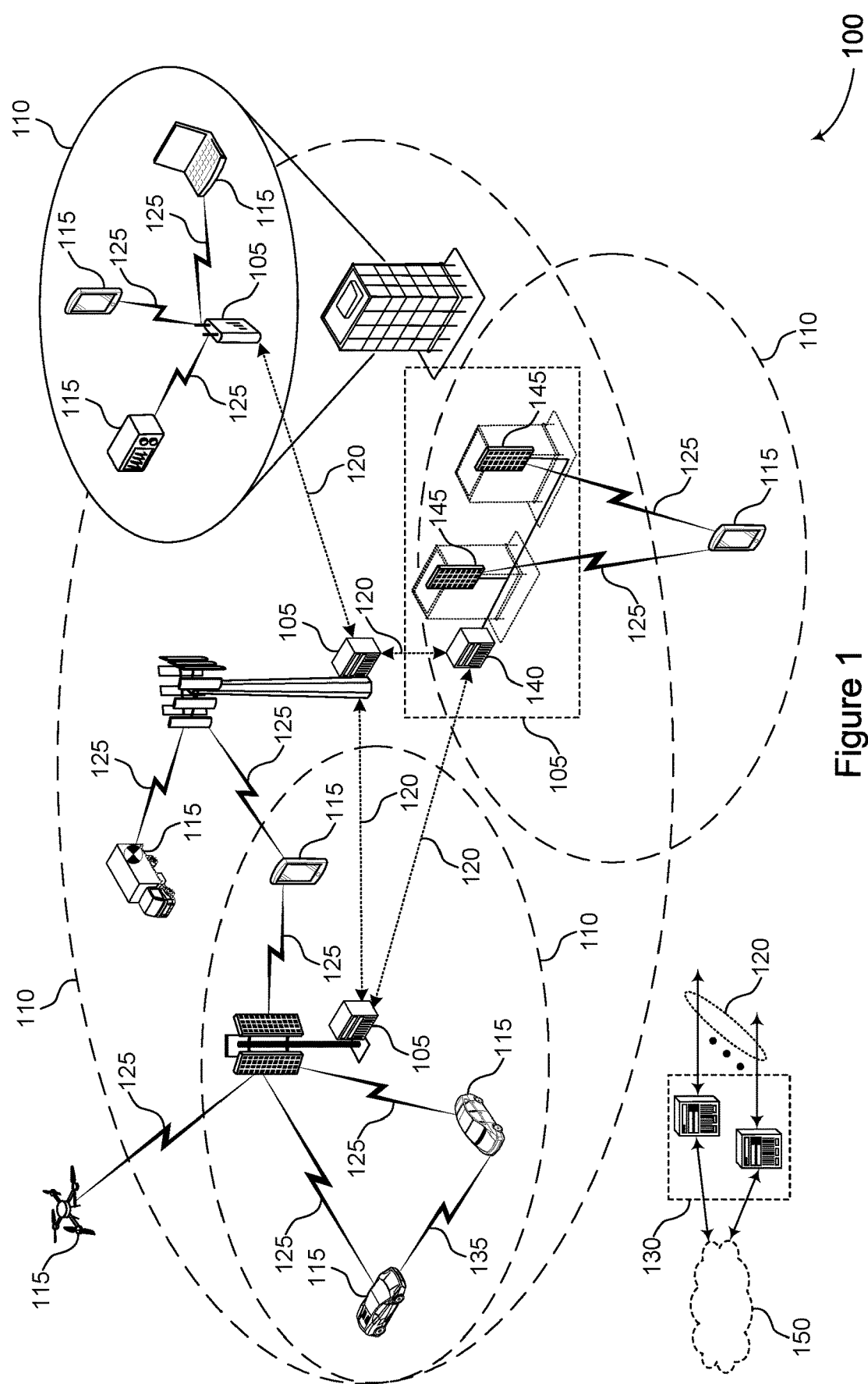
FIGS. 1 and 2 illustrate examples of wireless communications systems that support antenna panel selection for interference mitigation at a multi-panel device in accordance with aspects of the present disclosure.

The following description is directed to particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO.

Various aspects generally relate to dynamically determining or adjusting a coverage region associated with at least some of multiple antenna panels of a multi-panel device operating over an ultra-wide bandwidth (for example, an FR4 frequency band, such as 52.6-114.25 GHz) based on array gain patterns of each of the multiple antenna panels. Some aspects more specifically relate to determining, for each if not all of the multiple antenna panels of the multi-panel device, an angular range over which the multi-panel device may transmit or receive using that antenna panel without the formation of a grating lobe. Each antenna panel of the multi-panel device may be associated with an array gain pattern that varies based on the angular range over which the multi-panel device can communicate using that antenna panel, such that the use of some angular ranges (such as wider angular ranges) may result in a formation of a grating lobe within the array gain pattern of that antenna panel while the use of some other angular ranges (such as narrower angular ranges) may avoid a formation of a grating lobe within the array gain pattern of that antenna panel. As such, the multi-panel device may determine, for at least some of the antenna panels of the multi-panel device, a coverage region defined by an angular range that is associated with an array gain pattern excluding a grating lobe. In some implementations, the multi-panel device may determine a first coverage region associated with a first antenna panel such that the multi-panel device avoids the formation of a grating lobe from the first antenna panel and may additionally determine a second coverage region associated with a second antenna panel to complement the first coverage region associated with the first antenna panel. The multi-panel device may communicate with a second device using the first antenna panel if the second device is located at an angular direction within the first coverage region or using the second antenna panel if the second device is located at an angular direction within the second coverage region.

Particular implementations of the subject matter described in this disclosure can be implemented to realize one or more of the following potential advantages. In some implementations, the described techniques can be used by the multi-panel device to reduce the amount of interference in a system based on dynamically or adaptively configuring coverage regions associated with antenna panels of the multi-panel device to avoid the formation of grating lobes. Further, such dynamic or adaptive multi-panel configuration to avoid the formation of grating lobes may reduce ambiguity in beam management procedures because the absence of a grating lobe may increase the likelihood for a device to distinguish between a main lobe and any side lobes propagating from the multi-panel device. The described techniques can also be used to dynamically or adaptively configure or reconfigure the coverage region associated with each if not all of the antenna panels of the multi-panel device based on a power or thermal constraint of the multi-panel device. For example, the multi-panel device may determine that an antenna panel is over-heating (such that one or more hardware components of the antenna panel fail to satisfy a power or thermal constraint of the multi-panel device) and the multi-panel device may reduce (partially or completely) the coverage region over which the multi-panel device may transmit or receive using the antenna panel as a result of the over-heating. The multi-panel device may correspondingly dynamically increase the coverage region of a different antenna panel to maintain a total coverage region of the multi-panel device (for example, to compensate for the reduced coverage region of the over-heating antenna panel). As such, the multi-panel device may provide more seamless coverage while satisfying the power and thermal constraint of the multi-panel device.

FIG. 1 illustrates an example of a wireless communications system 100 that supports antenna panel selection for interference mitigation at a multi-panel device in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology. The "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier. The symbol period and subcarrier spacing are inversely related. The number of bits carried by each resource element may depend on the modulation scheme (for example, the order of the modulation scheme, the coding rate of the modulation scheme, or both). The more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported. In some examples, a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit, which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode if not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), such that multiple spatial layers are transmitted to the same receiving device, and multiple-user MIMO (MU-MIMO), such that multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) if receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, if receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback and the device may provide HARQ feedback in a specific slot for data received in a previous symbol in the slot. In other cases, the device may provide HARQ feedback in a subsequent slot, or according to some other time interval.

In some cases, the wireless communications system 100 may support the use of FR2 radio frequency bands or higher radio frequency bands, such as FR4 radio frequency bands. FR2 may refer to frequency bands above 6 GHz, including frequency bands between 24.25 GHz and 52.6 GHz. FR4 may refer to frequency bands above 52.6 GHz, such as frequency bands between 52.6 GHz and 114.25 GHz. In some aspects, such FR4 frequency bands may be referred to as upper mmW bands or as frequency bands within a sub-THz regime. The wavelength ($\lambda$) of transmissions may decrease as its frequency increases, such that the wavelength of a signal transmitted at an upper mmW band may be smaller than the wavelength of a signal transmitted over an FR2 frequency band. Likewise, a physical aperture deployed as an antenna array or panel may include more antenna elements if a device is communicating at higher frequencies than at lower frequencies. For example, an antenna array or panel may include more antenna elements for communication at FR4 than at FR2. For instance, a 4×1 antenna array at an FR2 frequency band may become an 8×2 antenna array at 60 GHz, a 16×4 antenna array at 120 GHz, and so on.

Additionally, FR4 frequency bands may be relatively larger (span a relatively greater amount of frequency resources or span a relatively greater frequency range) than FR2 frequency bands. For example, the frequency range between 57-71 GHz may be an example of an FR4 frequency band, which may include an approximately 14 GHz-wide bandwidth. Such bandwidth may be referred to herein as an ultra-wide bandwidth. A device, such as a base station 105 or a UE 115, may use a portion of an FR4 bandwidth (such as a portion between 57-71 GHz) that is allocated to the device and, in some cases, may achieve performance or beamforming gains using such a portion of the FR4 bandwidth. In some aspects, the device may be allocated or otherwise determine to use a 2 GHz portion of the bandwidth (for example, a 2 GHz portion between 57-71 GHz). In such aspects, up to seven devices may each use a different 2 GHz portion of the bandwidth at a time. In some cases, the device may have an allocation of the portion of the FR4 bandwidth for a first number of slots and may have an allocation of a different frequency resource for a second number of slots (for example, after the first number of slots). The different frequency resource may be a different portion of the FR4 frequency band or a frequency resource of an FR1 frequency band or an FR2 frequency band. For instance, in examples in which the device has an allocation of resources in the FR4 frequency band for both the first number of slots and the second number of slots, the device may initially have an allocation of 57-59 GHz and may be subsequently have an allocation of 59-61 GHz, 61-63 GHz, or any other portion of the FR4 frequency band.

In some cases, the device may use a single radio frequency chain for communication over the FR4 bandwidth (the ultra-wide bandwidth) and the single radio frequency chain may be associated with a single set of phase shifters. As such, analog or radio frequency beamforming may be constrained or otherwise limited to the single set of phase shifters, which may result in sub-optimal performance at some frequencies. For example, the device may use a set of phase shifters and beam weights to steer a beam towards a target direction or a target carrier frequency and, in cases in which the device switches from one carrier frequency (such as 57-59 GHz) to a different carrier frequency (such as 59-61 GHz or 61-63 GHz) within an ultra-wide bandwidth, the device may be unable to dynamically change the beam weights on the fly because a processing, a beam weight settling, or a radio frequency settling timeline may be too small, which may result in the generation of beams that are no longer oriented towards the target direction and the formation of undesirable side and grating lobes. For instance, a main beam may point away from the target direction, side lobes may point away, nulls may point away, and grating lobes may form. In other words, in cases in which the device switches from one carrier frequency to a different carrier frequency within an ultra-wide bandwidth (such as an FR4 band), the device may be unable to adjust the radio frequency chain associated with the bandwidth and there may be a mismatch between what the beam was originally designed for and what the device actually generates.

Further, the device, based on communicating using a carrier frequency within an FR4 frequency band, may communicate with other devices over a wider area. The device, however, may be unable to add antenna panels (or antenna modules) to compensate for the wider area over which the device may be tasked to communicate and, in some cases, may be limited to one antenna panel (or one antenna module) based on an antenna panel configuration. In such cases, the device may increase a coverage region associated with the one antenna panel to cover the wider area. For example, the device may increase an angular range associated with the antenna panel from ±45° around a boresight associated with the antenna panel to ±60° around the boresight associated with the antenna panel to communicate (to transmit or perform beam scanning) over the wider area. In such examples, the device may generate a grating lobe at an angle relative to the angle at which the device is communicating. Such a grating lobe may have an array gain similar to an array gain of a main lobe (which may correspond to a transmit beam or a receive beam) and, as such, the presence of the grating lobe may lead to ambiguities in beam management or refinement procedures (as other devices may be unable to differentiate between the main lobe and the grating lobe), interference, and poor beam design.

In some implementations of the present disclosure, a multi-panel device may dynamically switch from using a single antenna panel to using multiple antenna panels to avoid the use of wide-angle scanning by a single antenna panel and may dynamically determine a coverage region associated with each of the multiple panels to avoid the formation of grating lobes from any one of the multiple antenna panels. In some examples, the multi-panel device may determine the coverage regions associated with the multiple antenna panels based on array gain patterns of the multiple panels (which may be usable by the multi-panel device to determine a presence or a location of grating lobes as a function of the coverage region associated with each of the multiple antenna panels). For example, the multi-panel device may switch to using a first antenna panel and a second antenna panel and may determine a first coverage region associated with the first antenna panel and a second coverage region associated with the second antenna panel based on their respective array gain patterns. For example, the multi-panel device may determine the first coverage region associated with the first antenna panel based on determining a first angular range that avoids a formation of a first grating lobe of a first array gain pattern of the first antenna panel and may determine the second coverage region associated with the second antenna panel based on determining a second angular range that avoids a formation of a second grating lobe of a second array gain pattern of the second antenna panel.

The multi-panel device, based on determining the first coverage region associated with the first antenna panel and the second coverage region associated with the second antenna panel, may communicate with a second device using either the first antenna panel or the second antenna panel. For example, the multi-panel device may determine that the second device is located at an angular direction within the first angular range associated with the first coverage region and may communicate with the second device using the first antenna panel. Alternatively, the device may determine that the second device is located at an angular direction within the second angular range associated with the second coverage region and may communicate with the second device using the second antenna panel.

Figure 2:
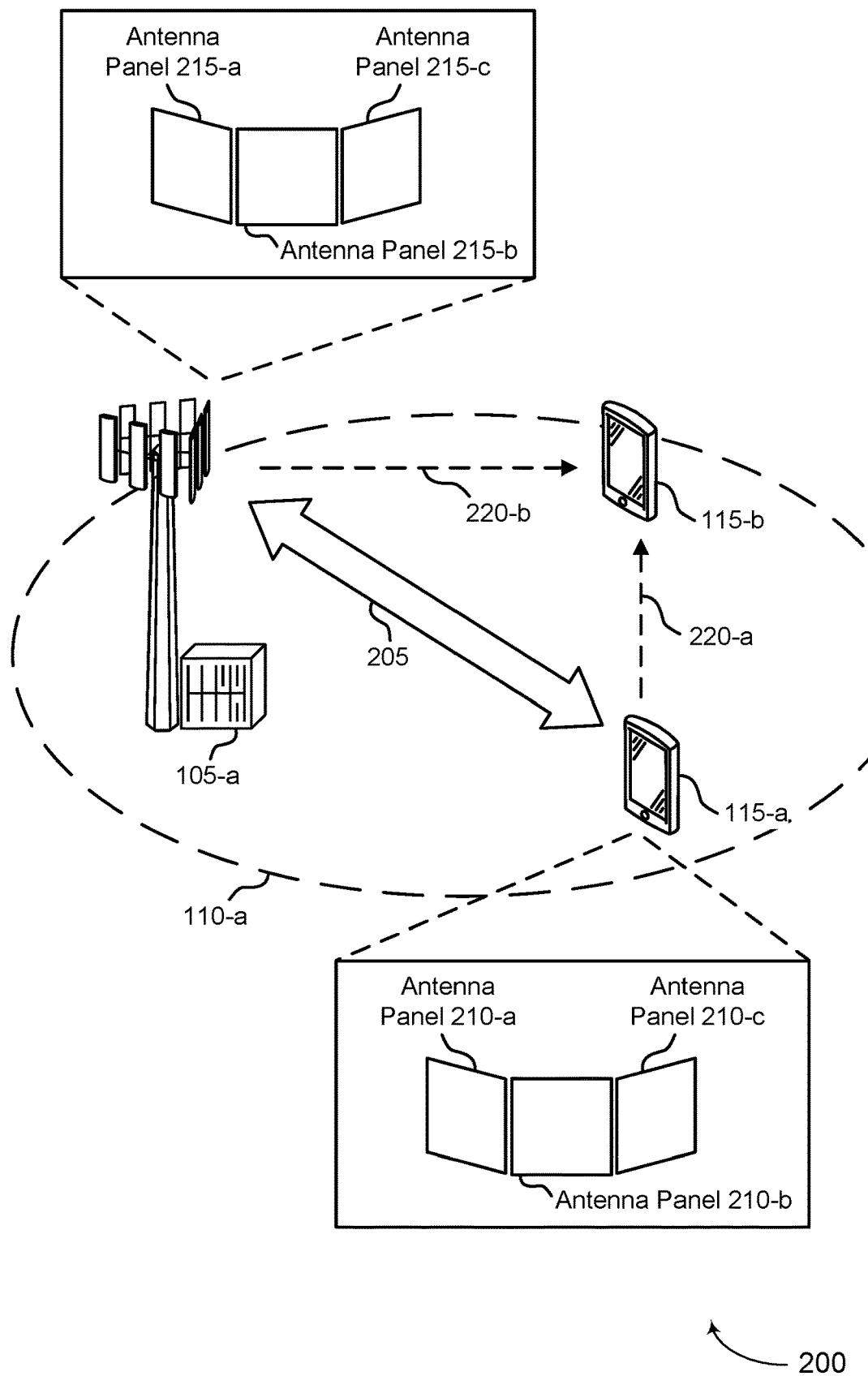

FIG. 2 illustrates an example of a wireless communications system 200 that supports antenna panel selection for interference mitigation at a multi-panel device in accordance with aspects of the present disclosure. In some examples, the wireless communications system 200 may implement aspects of the wireless communications system 100. For example, the wireless communications system 200 may support communication in an FR2 frequency band or an FR4 frequency band and ultra-wide bandwidth operations over both bands. The wireless communications system 200 may illustrate communication between a base station 105-a, a UE 115-a, and a UE 115-b, which may be examples of corresponding devices described herein, within a geographic coverage area 110-a. The base station 105-a and the UE 115-a may communicate over a communication link 205 and may be examples of multi-panel devices. In some examples, the base station 105-a, or the UE 115-a, or both, may determine coverage regions for each if not all of their respective antenna panels to avoid the formation of grating lobes that may cause interference 220 at other devices, such as at the UE 115-b.

Grating lobes may form in cases in which a half wavelength (for example, $\lambda/2$) of a signal is less than an inter-element spacing of an antenna panel. For example, an antenna panel may be constructed according to an inter-element spacing d and grating lobes may form in cases in which a device transmits or performs beam scanning at a frequency associated with a wavelength $\lambda$ such that $d>\lambda/2$. For instance, an antenna panel including a 16×1 linear array may be constructed as two 8×1 arrays covering 37-40 GHz such that the inter-element spacing d=4.2 mm with three tile gap possibilities (such as 0 mm, 0.5 mm, and 1 mm). An inter-element spacing d=4.2 mm may correspond to $0.5\lambda$ at 35.7 GHz, $0.52\lambda$ at 37 GHz, and $0.56\lambda$ at 40 GHz. As such, in cases in which the inter-element spacing d=4.2 mm, grating lobes may form for communication at frequencies greater than 35.7 GHz. Such formation of grating lobes may be more likely in scenarios of a wideband coverage, in which many frequencies may be associated with a half wavelength less than the inter-element spacing that was used to construct the antenna panel.

Further, the likelihood for the formation of grating lobes may increase for wider angle scans, such as scans of approximately ±60° or greater relative to a boresight of an antenna panel. As such, for a codebook of a set of (such as 16) progressive phase shift (PPS) or discrete Fourier transform (DFT) beams used to scan ±60° with a focus on 40 GHz (such that $d>\lambda/2$) performance, the formation of grating lobes may occur at some angles relative to a main lobe of the antenna panel. Such grating lobes may have the same or approximately the same gain as the main lobe (without elemental gain considered) with reduced beamwidths, and may lead to ambiguities with beam management or refinement, interference 220, and overall poor beam design.

For example, in cases in which the UE 115-a transmits or receives over a wide angle using an antenna panel 210 and a frequency such that $d>\lambda/2$, the UE 115-a may incidentally generate a grating lobe that may cause interference 220-a at the UE 115-b. Similarly, in cases in which the base station 105-a transmits or receives over a wide angle using an antenna panel 215 and a frequency such that $d>\lambda/2$, the base station 105-a may incidentally generate a grating lobe that may cause interference 220-b at the UE 115-b. For example, the base station 105-a or the UE 115-a may transmit or receive signals over a wide angle over mmW frequency bands (such as FR2 frequency bands) or upper mmW bands (such as FR4 frequency bands), which may be associated with waveforms having a half wavelength that is smaller than the inter-element spacing that was used to construct the antenna panel. Further, a device may be limited to static antenna panel selection and such variation in the presence of grating lobes (which may correspond to a performance of an array gain pattern of an analog or radio frequency beamforming codebook) may result in ambiguous beamforming management, the interference 220, and poor beam design.

In some implementations of the present disclosure, the UE 115-a or the base station 105-a may switch from using a single antenna panel to using multiple antenna panels, for example, based on determining that the UE 115-a or the base station 105-a is communicating at or within frequencies over which grating lobes are likely to form. For example, the UE 115-a may initially communicate using an antenna panel 210 and, based on determining to communicate using frequencies over which grating lobes may likely form, may switch to using multiple antenna panels, such as an antenna panel 210-*a*, an antenna panel 210-*b*, and an antenna panel 210-*c*. Similarly, the base station 105-*a* may initially communicate using an antenna panel 215 and, based on determining to communicate using frequencies over which grating lobes may likely form, may switch to using multiple antenna panels, such as an antenna panel 215-*a*, an antenna panel 215-*b*, and an antenna panel 215-*c*. As such, the UE 115-*a* or the base station 105-*a* may avoid wide angle scanning using a single antenna panel, which may avoid or reduce the likelihood for the formation of grating lobes. The UE 115-*a* or the base station 105-*a* may partition or allocate portions of a coverage region of the UE 115-*a* or the base station 105-*a*, respectively, between the multiple antenna panels in various ways, as described in more detail with reference to FIG. 3.

In some examples, the UE 115-*a* or the base station 105-*a* may initially determine a coverage region for each of the multiple panels based on determining a multi-panel configuration associated with the multiple antenna panels supported by the UE 115-*a* or the base station 105-*a*, respectively. In such examples, the multi-panel configuration may explicitly indicate a coverage region that the UE 115-*a* or the base station 105-*a* may use for each if not all of the multiple antenna panels of the UE 115-*a* or the base station 105-*a*, respectively, or may provide information that the UE 115-*a* or the base station 105-*a* may use to determine the coverage regions for each if not all of the multiple antenna panels of the UE 115-*a* or the base station 105-*a*, respectively. For example, the multi-panel configuration may explicitly indicate coverage regions, may indicate a capability for multi-panel communication (such as dynamically configurable multi-panel communication), or any other information that is relevant to the UE 115-*a* or the base station 105-*a* for communicating using multiple antenna panels. In some implementations, the UE 115-*a* may transmit information associated with the array gain patterns of each if not all of the multiple antenna panels of the UE 115-*a* to the base station 105-*a* and may receive an indication of the multi-panel configuration from the base station 105-*a* in response to transmitting the information. In some aspects, the multi-panel configuration may be frequency dependent (for example, may vary as a function of the frequency at which the UE 115-*a* or the base station 105-*a* is communicating) and, as such, may be referred to herein as a carrier frequency dependent multi-panel configuration. For example, the UE 115-*a* or the base station 105-*a* may use the multi-panel configuration for (such as exclusively used for) multi-panel communication at an FR2 frequency band or at an FR4 frequency band.

Additionally or alternatively, the UE 115-*a* or the base station 105-*a* may initially determine a coverage region for each of the multiple panels based on determining a gain of the main lobe associated with each antenna panel of the multiple antenna panels supported by the base station 105-*a* or the UE 115-*a*, respectively. For example, the UE 115-*a* may identify a first gain of a first main lobe of the antenna panel 210-*a*, a second gain of a second main lobe of the antenna panel 210-*b*, and a third gain of a third main lobe of the antenna panel 210-*c* and may determine a first coverage region associated with the antenna panel 210-*a*, a second coverage region associated with the antenna panel 210-*b*, and a third coverage region associated with the antenna panel 210-*c* based on the first gain of the first main lobe, the second gain of the second main lobe, and the third gain of the third main lobe.

For instance, the UE 115-*a* may determine that the second gain of the second main lobe has a greatest gain and may select the antenna panel 210-*b* as a relatively wider angular coverage antenna panel and may select the antenna panel 210-*a* and the antenna panel 210-*c* as relatively narrower angular coverage antenna panels. As such, the UE 115-*a* may communicate using any one of the antenna panel 210-*a*, the antenna panel 210-*b*, and the antenna panel 210-*c*, but may use the antenna panel 210-*b* to communicate over a relatively wider angular range and may use the antenna panel 210-*a* and the antenna panel 210-*c* to communicate over relatively narrower angular ranges (for example, the UE 115-*a* may use the antenna panel 210-*a* and the antenna panel 210-*c* as complementary antenna panels to the antenna panel 210-*b*).

Similarly, the base station 105-*a* may identify a first gain of a first main lobe of the antenna panel 215-*a*, a second gain of a second main lobe of the antenna panel 215-*b*, and a third gain of a third main lobe of the antenna panel 215-*c* and may determine a first coverage region associated with the antenna panel 215-*a*, a second coverage region associated with the antenna panel 215-*b*, and a third coverage region associated with the antenna panel 215-*c* based on the first gain of the first main lobe, the second gain of the second main lobe, and the third gain of the third main lobe.

For example, the base station 105-*a* may determine that the second gain of the second main lobe has a greatest gain and may select the antenna panel 215-*b* as a relatively wider angular coverage antenna panel and may select the antenna panel 215-*a* and the antenna panel 215-*c* as relatively narrower angular coverage antenna panels. As such, the base station 105-*a* may communicate using any one of the antenna panel 215-*a*, the antenna panel 215-*b*, and the antenna panel 215-*c*, but may use the antenna panel 215-*b* to communicate over a relatively wider angular range and may use the antenna panel 215-*a* and the antenna panel 215-*c* to communicate over relatively narrower angular ranges (for example, the base station 105-*a* may use the antenna panel 215-*a* and the antenna panel 215-*c* as complementary antenna panels to the antenna panel 215-*b*).

In some implementations, the UE 115-*a* or the base station 105-*a* may adaptively or dynamically change the coverage region associated with each if not all of the multiple antenna panels of the UE 115-*a* or the base station 105-*a*, respectively, based on determining that a third device, such as the UE 115-*b*, is experiencing interference 220 that exceeds a threshold level of interference as a result of the multi-panel communication using the initially or previously determined coverage regions. In some examples, for instance, the UE 115-*b* may transmit an interference measurement report to the UE 115-*a* or the base station 105-*a*, the interference measurement report including an interference metric associated with the array gain patterns of the antenna panels used by the UE 115-*a* or the base station 105-*a* to communicate over the communication link 205. For example, each of the multiple panels that the UE 115-*a* or the base station 105-*a* use to communicate may be associated with an array gain pattern representative of the energy levels (or gain) experienced at various angles relative to the antenna panel and, in some examples, the UE 115-*b* may experience interference 220 associated with energy from the antenna panel and may provide a measurement of such energy to the UE 115-*a* or the base station 105-*a* via the interference metric.

For example, the UE 115-*a* may receive, from the UE 115-*b*, an interference metric associated with the interference 220-*a* inflicted at the UE 115-*b* by the UE 115-*a*, which may be associated with a first array gain pattern of the antenna panel 210-*a*, a second array gain pattern of the antenna panel 210-*b*, or a third array gain pattern of the antenna panel 210-c, or any combination thereof. In some examples, the UE 115-a may determine that the interference metric fails to satisfy a threshold (such as exceeds a threshold level of interference) and may dynamically adjust the coverage regions associated with the multiple panels used by the UE 115-a for communication with the base station 105-a or switch to using different antenna panels for communication with the base station 105-a. For example, the UE 115-a may initially or previously determine a first coverage region associated with the antenna panel 210-a, a second coverage region associated with the antenna panel 210-b, and a third coverage region associated with the antenna panel 210-c and, based on determining that the interference metric fails to satisfy the threshold, may dynamically determine a fourth coverage region associated with the antenna panel 210-a, a fifth coverage region associated with the antenna panel 210-b, and a sixth coverage region associated with the antenna panel 210-c.

In some examples, the UE 115-a may determine the fourth coverage region associated with the antenna panel 210-a, the fifth coverage region associated with the antenna panel 210-b, and the sixth coverage region associated with the antenna panel 210-c based on the array gain pattern of each of the antenna panel 210-a, the antenna panel 210-b, and the antenna panel 210-c and the received interference metric. For example, the fourth coverage region associated with the antenna panel 210-a, the fifth coverage region associated with the antenna panel 210-b, and the sixth coverage region associated with the antenna panel 210-c may each be associated with an angular range that avoids the formation of grating lobes or mitigates the interference that a grating lobe (or any other lobe) may cause at the UE 115-b. In such examples, the UE 115-a may prioritize interference mitigation or avoidance over the gain (such as the SNR) associated with the main lobe of the antenna panels 210.

Similarly, the base station 105-a may receive, from the UE 115-b, an interference metric associated with the interference 220-b inflicted at the UE 115-b by the base station 105-a, which may be associated with a first array gain pattern of the antenna panel 215-a, a second array gain pattern of the antenna panel 215-b, or a third array gain pattern of the antenna panel 215-c, or any combination thereof. In some examples, the base station 105-a may determine that the interference metric fails to satisfy a threshold (such as exceeds a threshold level of interference) and may dynamically adjust the coverage regions associated with the multiple panels used by the base station 105-a for communication with the UE 115-a or switch to using different antenna panels for communication with the UE 115-a. For example, the base station 105-a may adjust the coverage regions associated with each of the antenna panel 215-a, the antenna panel 215-b, and the antenna panel 215-c such that the angular ranges associated with the adjusted coverage regions avoid the formation of grating lobes or mitigate the interference that a grating lobe (or any other lobe) may cause at the UE 115-b. In such examples, the base station 105-a may prioritize interference mitigation or avoidance over the gain (such as the SNR) associated with the main lobe of the antenna panels 215.

In some examples, the UE 115-b may transmit the interference measurement report to the UE 115-a or the base station 105-a based on receiving a message triggering the interference measurement report. For example, the UE 115-a or the base station 105-a may trigger the transmission of the interference measurement report from the UE 115-b based on over-the-air signaling to the UE 115-b. The UE 115-a or the base station 105-a may transmit such signaling to the UE 115-b based on a triggering event, such as if the UE 115-a or the base station 105-a adjust a coverage region of an antenna panel or switch one or more antenna panels, or according to some regular interval or periodicity patterns. In some other examples, the UE 115-b may transmit the interference measurement report without signaling from the UE 115-a or the base station 105-a. In such examples, the UE 115-b may transmit the interference measurement report according to some regular interval or periodicity pattern or based on determining that the interference 220 measured at the UE 115-b exceeds a threshold level of interference. In some implementations, the UE 115-a or the base station 105-a may transmit a feedback message to the UE 115-b including an indication that the interference measurement report was either successfully or unsuccessfully received. In some examples, such a feedback message may include an acknowledgement (ACK) for indicating successful reception or a negative acknowledgement (NACK) for indicating unsuccessful reception.

Additionally or alternatively, the UE 115-a or the base station 105-a may adaptively or dynamically change the coverage region associated with each if not all of the multiple antenna panels of the UE 115-a or the base station 105-a, respectively, based on determining that a power or thermal condition of one or more antenna panels of the multiple antenna panels used for the multi-panel communication fails to satisfy a power or thermal constraint. For example, the UE 115-a or the base station 105-a may determine that one or more of the antenna panels configured for communication are overheating or are consuming greater than a threshold amount of power and may either dynamically switch to using one or more different antenna panels or dynamically adjust (for example, reduce) the coverage region associated with the one or more antenna panels that are overheating or consuming greater than the threshold amount of power. In some implementations, the UE 115-a or the base station 105-a may monitor such power or thermal conditions at the antenna panels based on power or thermal readings of the antenna panels or of one or more hardware components associated with the antenna panels, such as power amplifiers. The UE 115-a or the base station 105-a, based on dynamically switching between antenna panels or coverage regions associated with the antenna panels based on a power or thermal constraint, may achieve more seamless coverage (for example, may avoid a complete shutdown to let components cool) while satisfying the power and thermal constraint of the UE 115-a or the base station 105-a. Such cooling down may also be realized by turning off some components, such as power amplifiers, which may reduce the coverage associated with an antenna panel as well as mitigating the power and thermal constraints.

Additionally, in some implementations, a manufacturer may determine a more optimal angular or spatial placement of antenna panels on the UE 115-a or the base station 105-a in a multi-panel configuration based on the array gain patterns of the antenna panels. For example, the manufacturer may determine the angular and spatial placement of antenna panels to provide for broader or wider beam scanning with a multi-panel setup while avoiding (or mitigating the interference caused by) grating lobes for transmissions or receptions over any angular direction within the broader angular region. Such an initial configuration for placing antenna panels to provide for broader or wider beam scanning in a multi-panel setup while avoiding grating lobes may include additional, potentially special-purpose hardware and may result in less interference and provide more angular coverage for the UE 115-a or the base station 105-a. Further, such antenna panel placement may provide for a more robust system and more efficient power and thermal management procedures.

Further, although described in the context of a system including the base station 105-*a*, the UE 115-*a*, and the UE 115-*b*, the described techniques may be applicable to any device or devices capable of wireless communication and multi-panel configurations, such as TRPs, customer premises equipment (CPEs), relay nodes, repeater nodes, IAB nodes, or central processors.

Figure 3:
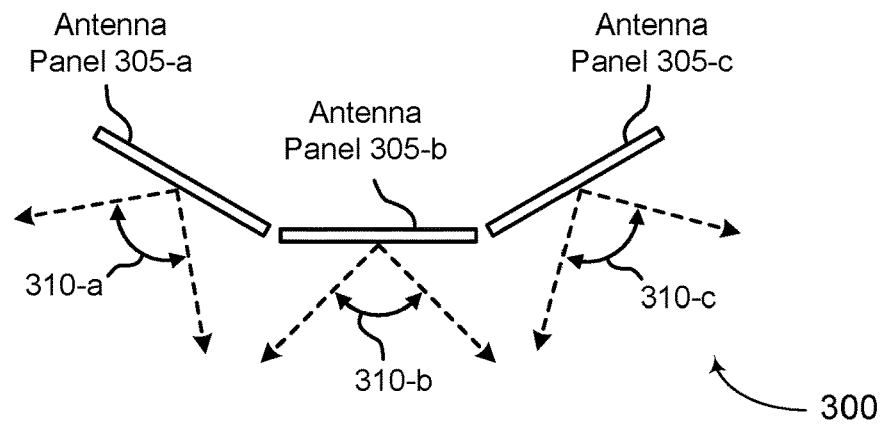
FIG. 3 illustrates examples of multi-panel configurations that support antenna panel selection for interference mitigation at a multi-panel device in accordance with aspects of the present disclosure.
Figure 3:
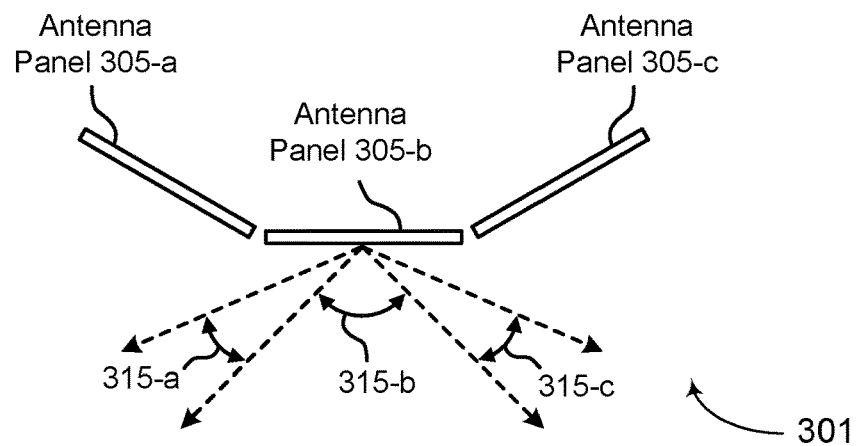
Figure 3:
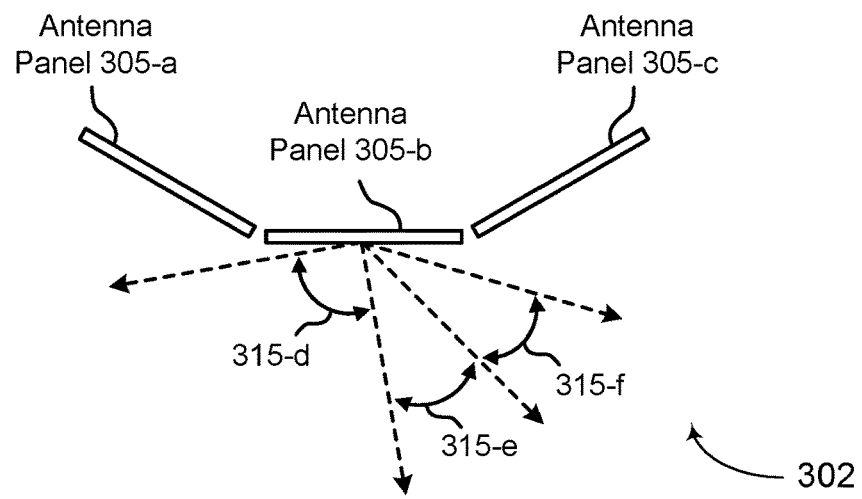

FIG. 3 illustrates examples of multi-panel configurations 300, 301, and 302 that support antenna panel selection for interference mitigation at a multi-panel device in accordance with aspects of the present disclosure. In some examples, the multi-panel configurations 300, 301, and 302 may be implemented to realize aspects of the wireless communications system 100 and the wireless communications system 200. For example, a multi-panel device, such as a UE 115 or a base station 105, may determine a coverage region 315 associated with each antenna panel 305 based on an array gain pattern of the antenna panel 305 to avoid the formation of grating lobes (or any other interference-generating side lobe) that may result in interference at another device.

The multi-panel configuration 300 may illustrate an example multi-panel setup including an antenna panel 305-*a*, an antenna panel 305-*b*, and an antenna panel 305-*c* of the multi-panel device. In some examples, the multi-panel device may determine an angular range 310 associated with each antenna panel 305 (which may be defined relative to a boresight of each of the antenna panels 305) over which the multi-panel device may transmit or perform beam scanning without generating a grating lobe. For example, the multi-panel device may determine the angular range 310 associated with each antenna panel 305 based on the array gain pattern of each antenna panel 305 such that the angular range 310 includes spatial angles that are associated with an array gain pattern (or a portion of an array gain pattern) that excludes a grating lobe.

For instance, the multi-panel device may determine that the antenna panel 305-*a* is associated with an angular range 310-*a* including spatial angles associated with a first array gain pattern (or a portion of the first array gain pattern) of the antenna panel 305-*a* that excludes a grating lobe. Similarly, the multi-panel device may determine that the antenna panel 305-*b* is associated with an angular range 310-*b* including spatial angles associated with a second array gain pattern (or a portion of the second array gain pattern) of the antenna panel 305-*b* that excludes a grating lobe and that the antenna panel 305-*c* is associated with an angular range 310-*c* including spatial angles associated with a third array gain pattern (or a portion of the third array gain pattern) of the antenna panel 305-*c* that excludes a grating lobe. As such, the multi-panel device may communicate over the angular range 310-*a* using the antenna panel 305-*a*, the angular range 310-*b* using the antenna panel 305-*b*, or the angular range 310-*c* using the antenna panel 305-*c* without generating a grating lobe. In some aspects, the angular range 310 associated with each of the antenna panels 305 may be approximately 30°.

The multi-panel configuration 301 may illustrate an example configuration of coverage regions 315 associated with each of the antenna panels 305 of the multi-panel setup. For example, the multi-panel configuration 301 may illustrate a coverage region 315-*a* associated with the antenna panel 305-*a*, a coverage region 315-*b* associated with the antenna panel 305-*b*, and a coverage region 315-*c* associated with the antenna panel 305-*c*. As shown, the multi-panel configuration 301 may illustrate examples in which the multi-panel device determines to use the antenna panel 305-*b* as a wider angular coverage antenna panel and the antenna panel 305-*a* and the antenna panel 305-*c* as narrower angular coverage antenna panels. In other words, the multi-panel device may determine to communicate using the antenna panel 305-*b* over a relatively wider coverage region 315-*b* and to communicate using the antenna panel 305-*a* and the antenna panel 305-*c* over a relatively narrower coverage region 315-*a* and a relatively narrower coverage region 315-*c*, respectively. In such examples in which the antenna panel 305-*b* is a main antenna panel and the antenna panel 305-*a* and the antenna panel 305-*c* are complementary antenna panels, the multi-panel device may use a smaller number of antenna elements or radio frequency components for the antenna panel 305-*a* and the antenna panel 305-*c* than for the antenna panel 305-*b*. In some aspects, the coverage region 315-*a* and the coverage region 315-*c* may be approximately 15° and the coverage region 315-*b* may be approximately 30°.

In some examples, the multi-panel device may determine to communicate using the antenna panel 305-*b* over the relatively wider coverage region 315-*b* based on the multi-panel configuration. In some other examples, the multi-panel device may determine to communicate using the antenna panel 305-*b* over the relatively wider coverage region 315-*b* based on a gain of a main lobe of the antenna panel 305-*b* being greater than the gains of the main lobes of the antenna panel 305-*a* and the antenna panel 305-*c*. For example, the main lobe of the antenna panel 305-*a* may be associated with a greater SNR, signal-to-interference-plus-noise ratio (SINR), or reference signal receive power (RSRP). In some other examples, the multi-panel device may determine to communicate using the antenna panel 305-*b* over the relatively wider coverage region 315-*b* based on receiving an interference measurement report from another device. In such examples, the multi-panel device may determine that communicating using the antenna panel 305-*b* over the relatively wider coverage region 315-*b* and communicating using the antenna panel 305-*a* and the antenna panel 305-*c* over relatively narrower coverage regions 315 results in less interference at the other device. For example, the multi-panel device may determine that an interference metric included in the interference measurement report received from the other device fails to satisfy a threshold and may dynamically or adaptively switch the coverage regions 315 associated with each of the antenna panels 305 to match the multi-panel configuration 301.

In some other examples, the multi-panel device may determine to communicate using the antenna panel 305-*b* over the relatively wider coverage region 315-*b* and to communicate using the antenna panel 305-*a* and the antenna panel 305-*c* over relatively narrower coverage regions 315 based on power or thermal constraints of the multi-panel device or one or more of the antenna panels 305. For example, the multi-panel device may initially determine the coverage regions 315 as shown in the multi-panel configuration 301 based on the power or thermal constraints of the one or more of the antenna panels 305 or may dynamically or adaptively switch the coverage regions 315 associated with each of the antenna panels 305 to match the multi-panel configuration 301 based on determining that one or more antenna panels 305 are associated with a power or thermal condition that fails to satisfy the power or thermal constraints.

The multi-panel configuration 302 may illustrate another example configuration of coverage regions 315 associated with each of the antenna panels 305 of the multi-panel setup. For example, the multi-panel configuration 302 may illustrate a coverage region 315-*d* associated with the antenna panel 305-*a*, a coverage region 315-*e* associated with the antenna panel 305-*b*, and a coverage region 315-*f* associated with the antenna panel 305-*c*. As shown, the multi-panel configuration 302 may illustrate examples in which the multi-panel device determines to use the antenna panel 305-*a* as a wider angular coverage antenna panel and the antenna panel 305-*b* and the antenna panel 305-*c* as narrower angular coverage antenna panels. In other words, the multi-panel device may determine to communicate using the antenna panel 305-*a* over a relatively wider coverage region 315-*d* and to communicate using the antenna panel 305-*b* and the antenna panel 305-*c* over a relatively narrower coverage region 315-*e* and a relatively narrower coverage region 315-*f*, respectively. In such examples in which the antenna panel 305-*a* is a main antenna panel and the antenna panel 305-*b* and the antenna panel 305-*c* are complementary antenna panels, the multi-panel device may use a smaller number of antenna elements or radio frequency components for the antenna panel 305-*b* and the antenna panel 305-*c* than for the antenna panel 305-*a*. In some aspects, the coverage region 315-*e* and the coverage region 315-*f* may be approximately 15° and the coverage region 315-*d* may be approximately 30°.

In some examples, the multi-panel device may determine to communicate using the antenna panel 305-*a* over the relatively wider coverage region 315-*d* based on the multi-panel configuration. In some other examples, the multi-panel device may determine to communicate using the antenna panel 305-*a* over the relatively wider coverage region 315-*d* based on a gain of a main lobe of the antenna panel 305-*a* being greater than the gains of the main lobes of the antenna panel 305-*b* and the antenna panel 305-*c*. For example, the main lobe of the antenna panel 305-*a* may be associated with a greater SNR, SINR, or RSRP. In some other examples, the multi-panel device may determine to communicate using the antenna panel 305-*a* over the relatively wider coverage region 315-*d* based on receiving an interference measurement report from another device. In such examples, the multi-panel device may determine that communicating using the antenna panel 305-*a* over the relatively wider coverage region 315-*d* and communicating using the antenna panel 305-*b* and the antenna panel 305-*c* over relatively narrower coverage regions 315 results in less interference at the other device. For example, the multi-panel device may determine that an interference metric included in the interference measurement report received from the other device fails to satisfy a threshold and may dynamically or adaptively switch the coverage regions 315 associated with each of the antenna panels 305 to match the multi-panel configuration 302.

In some other examples, the multi-panel device may determine to communicate using the antenna panel 305-*a* over the relatively wider coverage region 315-*d* and to communicate using the antenna panel 305-*b* and the antenna panel 305-*c* over relatively narrower coverage regions 315 based on a power or thermal constraint of the multi-panel device or of one or more of the antenna panels 305. For example, the multi-panel device may initially determine the coverage regions 315 as shown in the multi-panel configuration 302 based on the power or thermal constraint of the one or more of the antenna panels 305 or may dynamically or adaptively switch the coverage regions 315 associated with each of the antenna panels 305 to match the multi-panel configuration 302 based on determining that one or more antenna panels 305 are associated with a power or thermal condition that fails to satisfy the power or thermal constraint.

The multi-panel device may communicate with a second device using the antenna panels 305 according to either the multi-panel configuration 301 or the multi-panel configuration 302 and based on an angular direction of the second device relative to the multi-panel device. For instance, in examples in which the multi-panel device is operating according to the multi-panel configuration 301, the multi-panel device may communicate with the second device using the antenna panel 305-*a* if the second device is associated with an angular direction within the coverage region 315-*a* (for example, within the angular range associated with the coverage region 315-*a*), using the antenna panel 305-*b* if the second device is associated with an angular direction within the coverage region 315-*b* (for example, within the angular range associated with the coverage region 315-*b*), or using the antenna panel 305-*c* if the second device is associated with an angular direction within the coverage region 315-*c* (for example, within the angular range associated with the coverage region 315-*c*).

Similarly, in examples in which the multi-panel device is operating according to the multi-panel configuration 302, the multi-panel device may communicate with the second device using the antenna panel 305-*a* if the second device is associated with an angular direction within the coverage region 315-*d* (for example, within the angular range associated with the coverage region 315-*d*), using the antenna panel 305-*b* if the second device is associated with an angular direction within the coverage region 315-*e* (for example, within the angular range associated with the coverage region 315-*e*), or using the antenna panel 305-*c* if the second device is associated with an angular direction within the coverage region 315-*f* (for example, within the angular range associated with the coverage region 315-*f*).

The multi-panel configuration 301 and the multi-panel configuration 302 illustrate two example divisions of a total coverage region of the multi-panel device between the antenna panels 305 of the multi-panel device, and the described techniques may equally apply to any other division, partitioning, or allocation of a total coverage region of a multi-panel device into smaller coverage regions 315 associated with a number of antenna panels 305 without exceeding the scope of the present disclosure. Further, although described in the context of three antenna panels 305, the described techniques may also apply to a multi-panel device supporting any number of antenna panels 305, such as two antenna panels 305, four antenna panels 305, five antenna panels 305, and so on.

Figure 4:
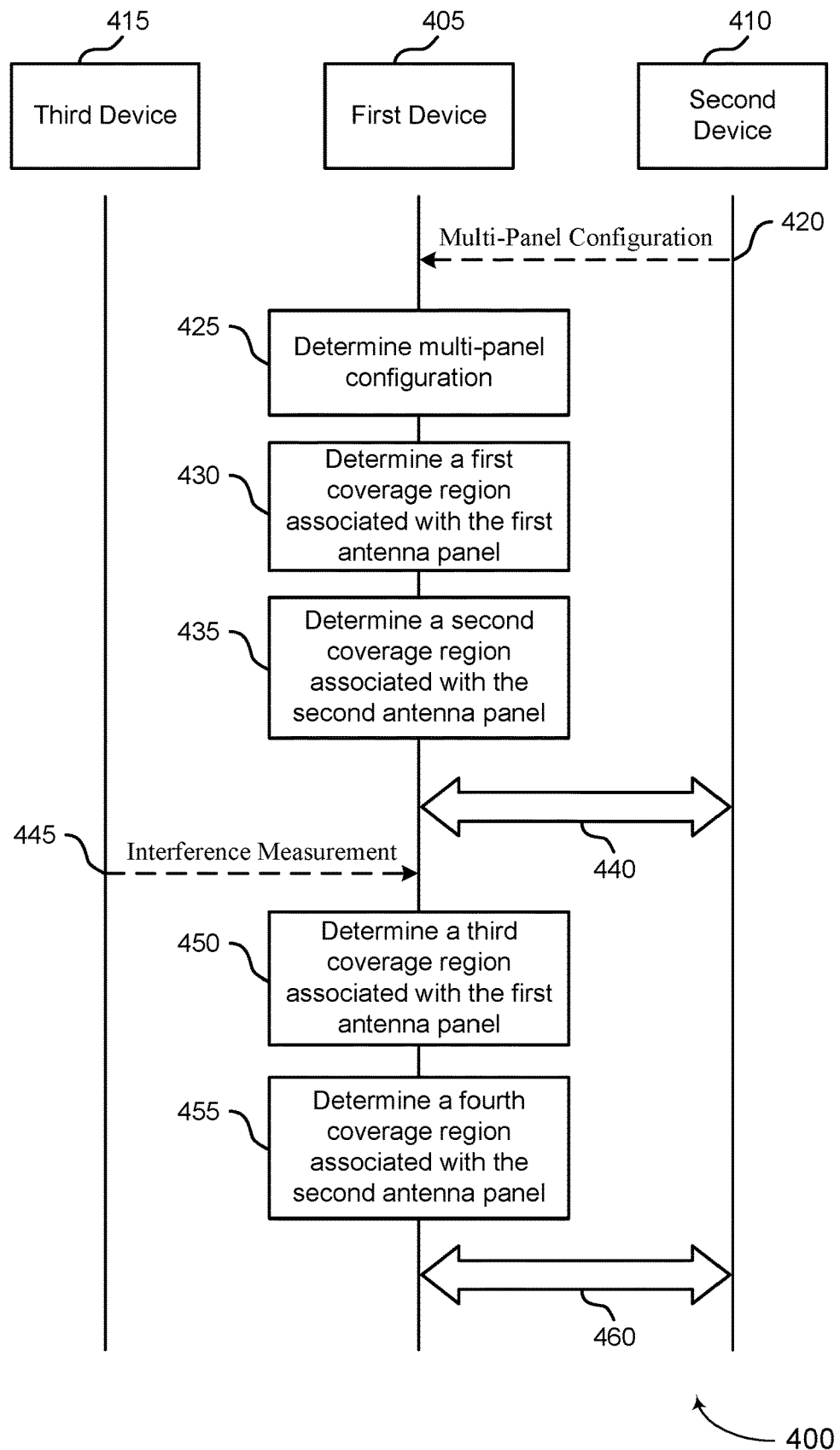
FIG. 4 illustrates an example of a process flow that supports antenna panel selection for interference mitigation at a multi-panel device in accordance with aspects of the present disclosure.

FIG. 4 illustrates an example of a process flow 400 that supports antenna panel selection for interference mitigation at a multi-panel device in accordance with aspects of the present disclosure. In some examples, the process flow 400 may implement aspects of the wireless communications system 100 and the wireless communications system 200. The process flow 400 may illustrate communications between a first device 405, a second device 410, and a third device 415. In some examples, the first device 405 may be an example of a multi-panel device including at least a first antenna panel and a second antenna panel, such as a base station 105 or a UE 115, and may dynamically or adaptively switch antenna panels or switch coverage regions associated with antenna panels based on interference arising from a grating lobe or based on a power or thermal constraint. Alternative examples of the process flow may be implemented, in which some features are performed in a different order than described or are not performed at all. In some examples, operations may include additional features not mentioned below, or further operations may be added.

At 420, the first device 405 may, in some implementations, receive an indication of a multi-panel configuration from the second device 410. In some examples, the second device 410 may transmit the indication of the multi-panel configuration to the first device 405 in response to receiving a transmission from the first device 405 that provides information associated with a first array gain pattern of the first antenna panel and a second array gain pattern of the second antenna panel. Such information associated with the first array gain pattern and the second array gain pattern may include an indication of a first gain of the first antenna panel and a second gain of the second antenna panel as functions of a spatial angle relative to the first antenna panel and the second antenna panel, respectively, and an indication of how the first gain and the second gain may vary as the first device 405 uses the first antenna panel and the second antenna panel to transmit or receive over different angular ranges. In some examples, the multi-panel configuration may explicitly indicate a first coverage region associated with the first antenna panel and a second coverage region associated with the second antenna panel or may provide information that the first device 405 may use to determine the coverage regions associated with the first antenna panel and the second antenna panel. Although shown as being received from the second device 410, the first device 405 may also receive the indication of the multi-panel configuration from a different device, such as the third device 415.

At 425, the first device 405 may determine the multi-panel configuration associated with at least the first antenna panel and the second antenna panel. In some examples, the multi-panel configuration may be a carrier frequency dependent multi-panel configuration. In examples in which the first device 405 receives the indication of the multi-panel configuration at 420, the first device 405 may determine the multi-panel configuration based on receiving the indication of the multi-panel configuration.

At 430, the first device 405 may determine a first coverage region associated with the first antenna panel. In some examples, the first device 405 may determine the first coverage region associated with the first antenna panel based on determining the angular range over which the first device 405 may communicate (transmit, receive, or perform beam scanning) while avoiding the formation or generation of grating lobes from the first antenna panel. Additionally or alternatively, the first device 405 may determine the first coverage region associated with the first antenna panel based on a power or thermal constraint of the first device 405 or of the first antenna panel. In some aspects, the first device 405 may determine the first coverage region associated with the first antenna panel based on the multi-panel configuration.

At 435, the first device 405 may determine a second coverage region associated with the second antenna panel. In some examples, the first device 405 may determine the second coverage region associated with the second antenna panel based on determining the angular range over which the first device 405 may communicate (transmit, receive, or perform beam scanning) while avoiding the formation or generation of grating lobes from the second antenna panel. Additionally or alternatively, the first device 405 may determine the second coverage region associated with the second antenna panel based on a power or thermal constraint of the first device 405 or of the second antenna panel. In some aspects, the first device 405 may determine the second coverage region associated with the second antenna panel based on the multi-panel configuration.

At 440, the first device 405 may communicate with the second device 410 based on determining the first coverage region associated with the first antenna panel and the second coverage region associated with the second antenna panel. For example, the first device 405 may determine that the second device 410 is located at an angular direction relative to the first device 405, and may communicate with the second device 410 using the first antenna panel if the angular direction is located within the first coverage region or may communicate with the second device 410 using the second antenna panel if the angular direction is located within the second coverage region.

At 445, the first device 405 may, in some implementations, receive, from the third device 415, an interference measurement report based on communicating with the second device 410 using the first antenna panel within the first coverage region or the second antenna panel within the second coverage region. For example, the third device 415 may experience interference arising from the communication between the first device 405 and the second device 410 that, in some examples, may be due to the formation of grating lobes towards the third device 415. In some implementations, the third device 415 may transmit the interference measurement report to the first device 405 based on receiving a message from the first device triggering interference measurement or the transmission of the interference measurement report, or both. In such implementations, the first device 405 may transmit the message to the third device 415 based on switching antenna panels or changing a coverage region associated with one or both of the first antenna panel and the second antenna pane. In some other implementations, the third device 415 may transmit the interference measurement report to the first device 405 according to a regular interval or periodicity. In some other implementations, the third device 415 may transmit the interference measurement report to the first device 405 based on determining that the interference at the third device 415 exceeds a threshold. The third device 415 may transmit the interference measurement report to the first device 405 over the same carrier frequency used for communication between the first device 405 or over a different carrier frequency.

The interference measurement report may include an interference metric and, in some examples, the first device may determine that the interference metric fails to satisfy a threshold. Additionally or alternatively (for example, in addition or as an alternative to receiving the interference measurement report at 445), the first device 405 may determine that a power or thermal condition at one or both of the first antenna panel and the second antenna panel fails to satisfy the power and thermal constraint of the first device 405. In either scenario, the first device 405 may determine to dynamically or adaptively switch antenna panels or adjust the coverage regions associated with the first antenna panel or the second antenna panel.

At 450, for example, the first device 405 may determine a third coverage region associated with the first antenna panel. In some examples, the first device 405 may determine the third coverage region associated with the first antenna panel based on adjusting the angular range over which the first device 405 may communicate (transmit, receive, or perform beam scanning) to avoid the formation or generation of grating lobes from the first antenna panel or to otherwise reduce the amount of interference that the third device 415 may experience. Additionally or alternatively, the first device 405 may adjust the coverage region associated with the first antenna panel to the third coverage region to satisfy the power or thermal constraint of the first device 405 or of the first antenna panel. For example, the third coverage region may be smaller than the first coverage region and the first device 405 may use the first antenna panel less often or operate the first antenna panel using fewer antenna elements or radio frequency components (which may reduce the power draw of the first antenna panel and potentially allow the first antenna panel to cool without service interruption).

At 455, the first device 405 may determine a fourth coverage region associated with the second antenna panel. In some examples, the first device 405 may determine the fourth coverage region associated with the second antenna panel based on adjusting the angular range over which the first device 405 may communicate (transmit, receive, or perform beam scanning) to avoid the formation or generation of grating lobes from the second antenna panel or to otherwise reduce the amount of interference that the third device 415 may experience. Additionally or alternatively, the first device 405 may adjust the coverage region associated with the second antenna panel to the fourth coverage region to satisfy the power or thermal constraint of the first device 405 or of the second antenna panel. For example, the fourth coverage region may be smaller than the second coverage region and the first device 405 may use the second antenna panel less often or operate the second antenna panel using fewer antenna elements or radio frequency components (which may reduce the power draw of the second antenna panel and potentially allow the second antenna panel to cool without service interruption).

Figure 5:
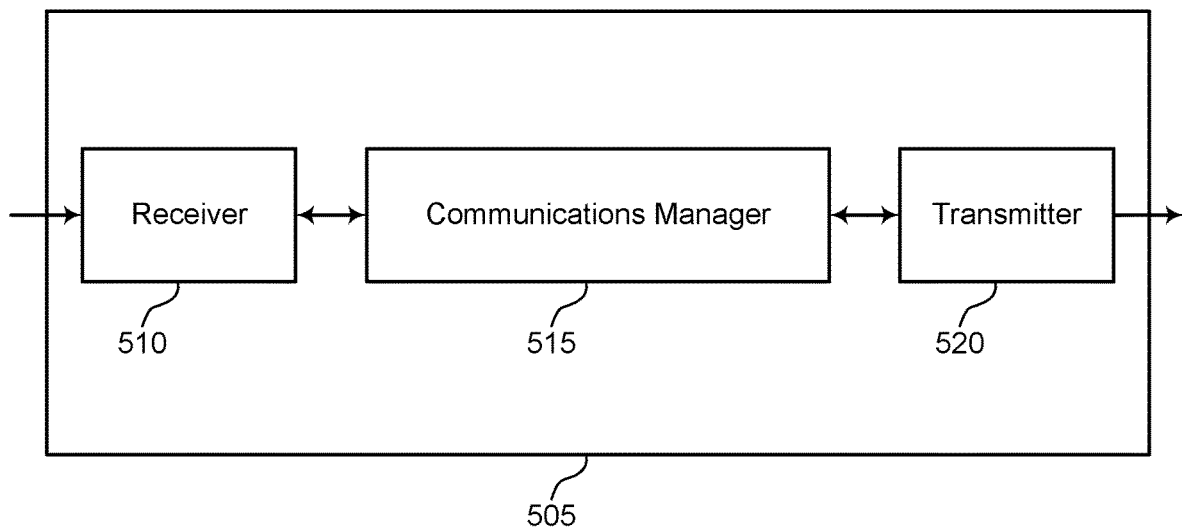
FIGS. 5 and 6 show block diagrams of devices that support antenna panel selection for interference mitigation at a multi-panel device in accordance with aspects of the present disclosure.

FIG. 5 shows a block diagram of a device 505 that supports antenna panel selection for interference mitigation at a multi-panel device in accordance with aspects of the present disclosure. The device 505 may be an example of a UE 115, a base station 105, or any other multi-panel device. The device 505 may include a receiver 510, a communications manager 515, and a transmitter 520. The communications manager 515 can be implemented, at least in part, by one or both of a modem and a processor. Each of these components may be in communication with one another (for example, via one or more buses).

The receiver 510 may receive information such as packets, user data, or control information associated with various information channels (for example, control channels, data channels, and information related to antenna panel selection for interference mitigation and power and thermal management at a multi-panel device). Information may be passed on to other components of the device 505. The receiver 510 may be an example of aspects of the transceiver 820 described with reference to FIG. 8. The receiver 510 may utilize a single antenna or a set of antennas.

The communications manager 515 may determine a carrier frequency dependent multi-panel configuration associated with at least a first antenna panel and a second antenna panel, determine a first coverage region associated with the first antenna panel and a second coverage region associated with the second antenna panel based on a first grating lobe of a first array gain pattern of the first antenna panel and a second grating lobe of a second array gain pattern of the second antenna panel, the first grating lobe different than a main lobe of the first array gain pattern and the second grating lobe different than a main lobe of the second array gain pattern, and communicate with a second device using one of the first antenna panel or the second antenna panel based on a location of the second device being in the first coverage region associated with the first antenna panel or the second coverage region associated with the second antenna panel.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

The communications manager 515 may be implemented to realize one or more potential advantages. In some implementations, the communications manager 515 may dynamically or adaptively change the coverage regions associated with multiple antenna panels that the communications manager 515 may use to communicate with a second device based on the array gain patterns of the multiple antenna panels, an indication of an interference level being caused by communication from the device 505, or based on a power or thermal condition or constraint of the device 505. As such, the communications manager may provide more seamless coverage while mitigating interference in the system or satisfying a power or thermal constraint of the device 505. As such, the communications manager 515 may provide for a greater likelihood for successful communication as a result reduced levels of interference or improved power savings with seamless coverage as a result of satisfying the power or thermal constraints of the device 505.

Figure 6:
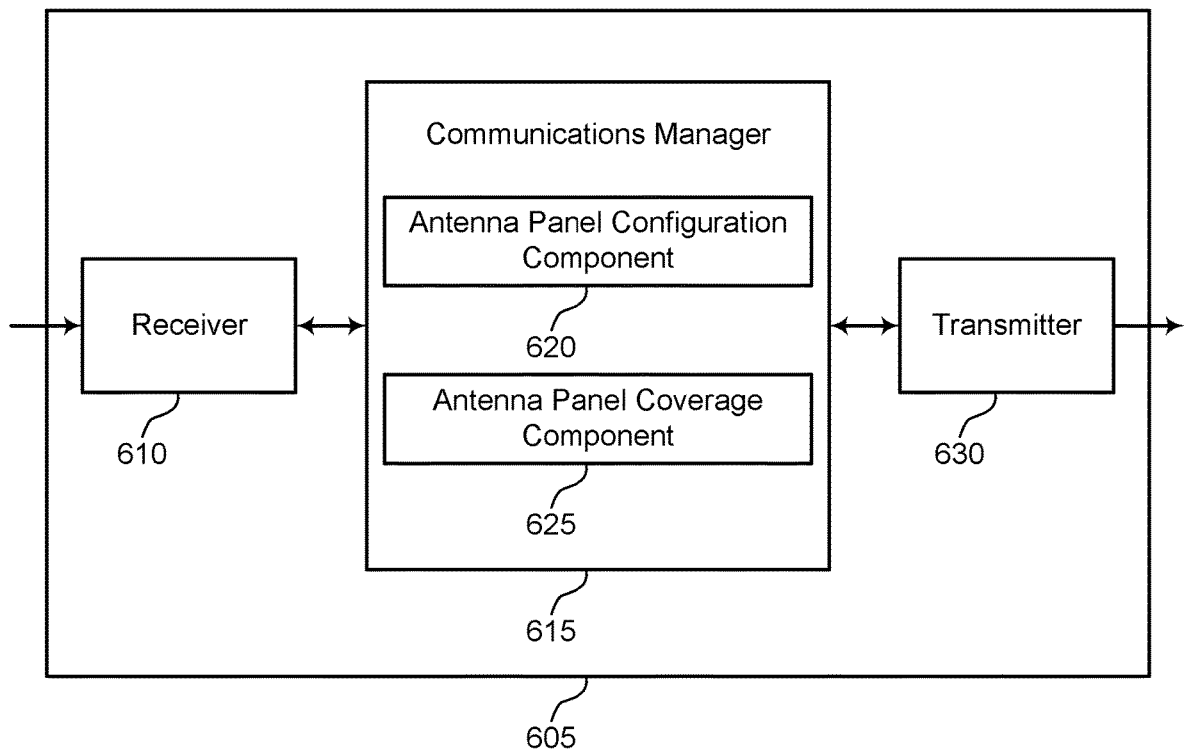

FIG. 6 shows a block diagram of a device 605 that supports antenna panel selection for interference mitigation at a multi-panel device in accordance with aspects of the present disclosure. The device 605 may be an example of aspects of a device 505, a UE 115, a base station 105, or any other multi-panel device. The device 605 may include a receiver 610, a communications manager 615, and a transmitter 630. The communications manager 615 can be implemented, at least in part, by one or more of a modem and a processor. Each of these components may be in communication with one another (for example, via one or more buses).

The receiver 610 may receive information such as packets, user data, or control information associated with various information channels (for example, control channels, data channels, and information related to antenna panel selection for interference mitigation and power and thermal management at a multi-panel device). Information may be passed on to other components of the device 605. The receiver 610 may be an example of aspects of the transceiver 820 described with reference to FIG. 8. The receiver 610 may utilize a single antenna or a set of antennas.

The communications manager 615 may include an antenna panel configuration component 620 and an antenna panel coverage component 625.

The antenna panel configuration component 620 may determine a carrier frequency dependent multi-panel configuration associated with at least a first antenna panel and a second antenna panel. The antenna panel coverage component 625 may determine a first coverage region associated with the first antenna panel and a second coverage region associated with the second antenna panel based on a first grating lobe of a first array gain pattern of the first antenna panel and a second grating lobe of a second array gain pattern of the second antenna panel, the first grating lobe different than a main lobe of the first array gain pattern and the second grating lobe different than a main lobe of the second array gain pattern and communicate with a second device using one of the first antenna panel or the second antenna panel based on a location of the second device being in the first coverage region associated with the first antenna panel or the second coverage region associated with the second antenna panel.

The transmitter 630 may transmit signals generated by other components of the device 605. In some examples, the transmitter 630 may be collocated with a receiver 610 in a transceiver component. For example, the transmitter 630 may be an example of aspects of the transceiver 820 described with reference to FIG. 8. The transmitter 630 may utilize a single antenna or a set of antennas.

Figure 7:
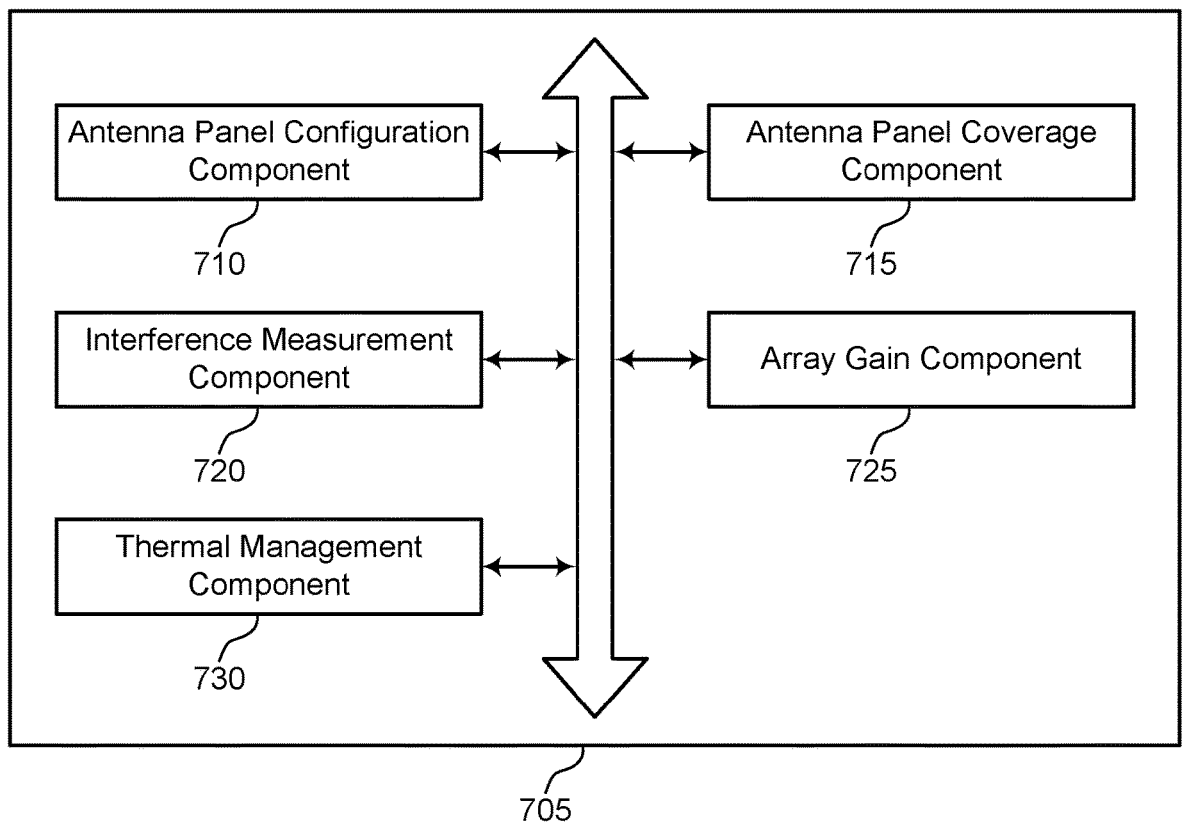
FIG. 7 shows a block diagram of a communications manager that supports antenna panel selection for interference mitigation at a multi-panel device in accordance with aspects of the present disclosure.

FIG. 7 shows a block diagram of a communications manager 705 that supports antenna panel selection for interference mitigation at a multi-panel device in accordance with aspects of the present disclosure. The communications manager 705 may be an example of aspects of a communications manager 515, a communications manager 615, or a communications manager 810 described herein. The communications manager 705 may include an antenna panel configuration component 710, an antenna panel coverage component 715, an interference measurement component 720, an array gain component 725, and a thermal management component 730. Each of these components may communicate, directly or indirectly, with one another (for example, via one or more buses).

The antenna panel configuration component 710 may determine a carrier frequency dependent multi-panel configuration associated with at least a first antenna panel and a second antenna panel. In some examples, the antenna panel configuration component 710 may receive, from the second device or the third device, an indication of the carrier frequency dependent multi-panel configuration associated with at least the first antenna panel and the second antenna panel based on transmitting the information. In some examples, determining the carrier frequency dependent multi-panel configuration is based on receiving the indication of the carrier frequency dependent multi-panel configuration.

The antenna panel coverage component 715 may determine a first coverage region associated with the first antenna panel and a second coverage region associated with the second antenna panel based on a first grating lobe of a first array gain pattern of the first antenna panel and a second grating lobe of a second array gain pattern of the second antenna panel, the first grating lobe different than a main lobe of the first array gain pattern and the second grating lobe different than a main lobe of the second array gain pattern. In some examples, the antenna panel coverage component 715 may communicate with a second device using one of the first antenna panel or the second antenna panel based on a location of the second device being in the first coverage region associated with the first antenna panel or the second coverage region associated with the second antenna panel.

In some examples, the antenna panel coverage component 715 may determine a third coverage region associated with the first antenna panel and a fourth coverage region associated with the second antenna panel based on determining that the interference metric fails to satisfy the threshold, the third coverage region different than the first coverage region and the fourth coverage region different than the second coverage region. In some examples, the antenna panel coverage component 715 may communicate with the second device using one of the first antenna panel or the second antenna panel based on the location of the second device being in the third coverage region associated with the first antenna panel or the fourth coverage region associated with the second antenna panel.

In some examples, the antenna panel coverage component 715 may determine a first angular range over which the first device can communicate using the first antenna panel based on the first array gain pattern of the first antenna panel. In some examples, the first coverage region includes the first angular range. In some examples, the antenna panel coverage component 715 may determine a second angular range over which the first device can communicate using the second antenna panel based on the second array gain pattern of the second antenna panel. In some examples, the second coverage region includes the second angular range.

In some examples, the antenna panel coverage component 715 may determine that an angular direction associated with the second device is located within the first angular range associated with the first antenna panel. In some examples, the antenna panel coverage component 715 may communicate with the second device using the first antenna panel. In some examples, the antenna panel coverage component 715 may determine that an angular direction associated with the second device is located within the second angular range associated with the second antenna panel.

In some examples, the antenna panel coverage component 715 may communicate with the second device using the second antenna panel. In some examples, the first device uses a first quantity of antenna elements associated with the first antenna panel and a second quantity of antenna elements associated with the second antenna panel based on determining the first coverage region associated with the first antenna panel and the second coverage region associated with the second antenna panel, the first quantity being different than the second quantity.

The interference measurement component 720 may receive, from a third device, an interference measurement report based on communicating with the second device using at least the first antenna panel within the first coverage region or the second antenna panel within the second coverage region, the interference measurement report including an interference metric associated with the first array gain pattern of the first antenna panel and the second array gain pattern of the second antenna panel.

In some examples, the interference measurement component 720 may determine that the interference metric fails to satisfy a threshold. In some examples, the interference measurement component 720 may transmit, to the third device, a message triggering the interference measurement report. In some examples, receiving the interference measurement report is based on transmitting the message.

In some examples, the interference measurement component 720 may transmit, to the third device, an ACK of receiving the interference measurement report. In some examples, the interference metric is based on an interference arising from the first main lobe or the first grating lobe of the first array gain pattern or the second main lobe or the second grating lobe of the second array gain pattern.

The array gain component 725 may determine that a first array gain of the main lobe of the first array gain pattern is greater than a second array gain of the main lobe of the second array gain pattern. In some examples, determining the first coverage region associated with the first antenna panel and the second coverage region associated with the second antenna panel is based on determining that the first array gain of the main lobe of the first array gain pattern is greater than the second array gain of the main lobe of the second array gain pattern.

In some examples, the array gain component 725 may transmit, to the second device or a third device, information associated with the first array gain pattern of the first antenna panel and the second array gain pattern of the second antenna panel. In some examples, the first angular range associated with the first antenna panel is associated with a first portion of the first array gain pattern of the first antenna panel, the first portion of the first array gain pattern excluding the first grating lobe of the first array gain pattern.

In some examples, the second angular range associated with the second antenna panel is associated with a second portion of the second array gain pattern of the second antenna panel, the second portion of the second array gain pattern excluding the second grating lobe of the second array gain pattern. In some examples, the first array gain pattern and the second array gain pattern are associated with an analog beamforming codebook usable for ultra-wide bandwidth operation at the first device with an operating frequency greater than 24.25 GHz.

The thermal management component 730 may determine the first coverage region associated with the first antenna panel and the second coverage region associated with the second antenna panel is based on a power constraint or a thermal constraint of the first device.

Figure 8:
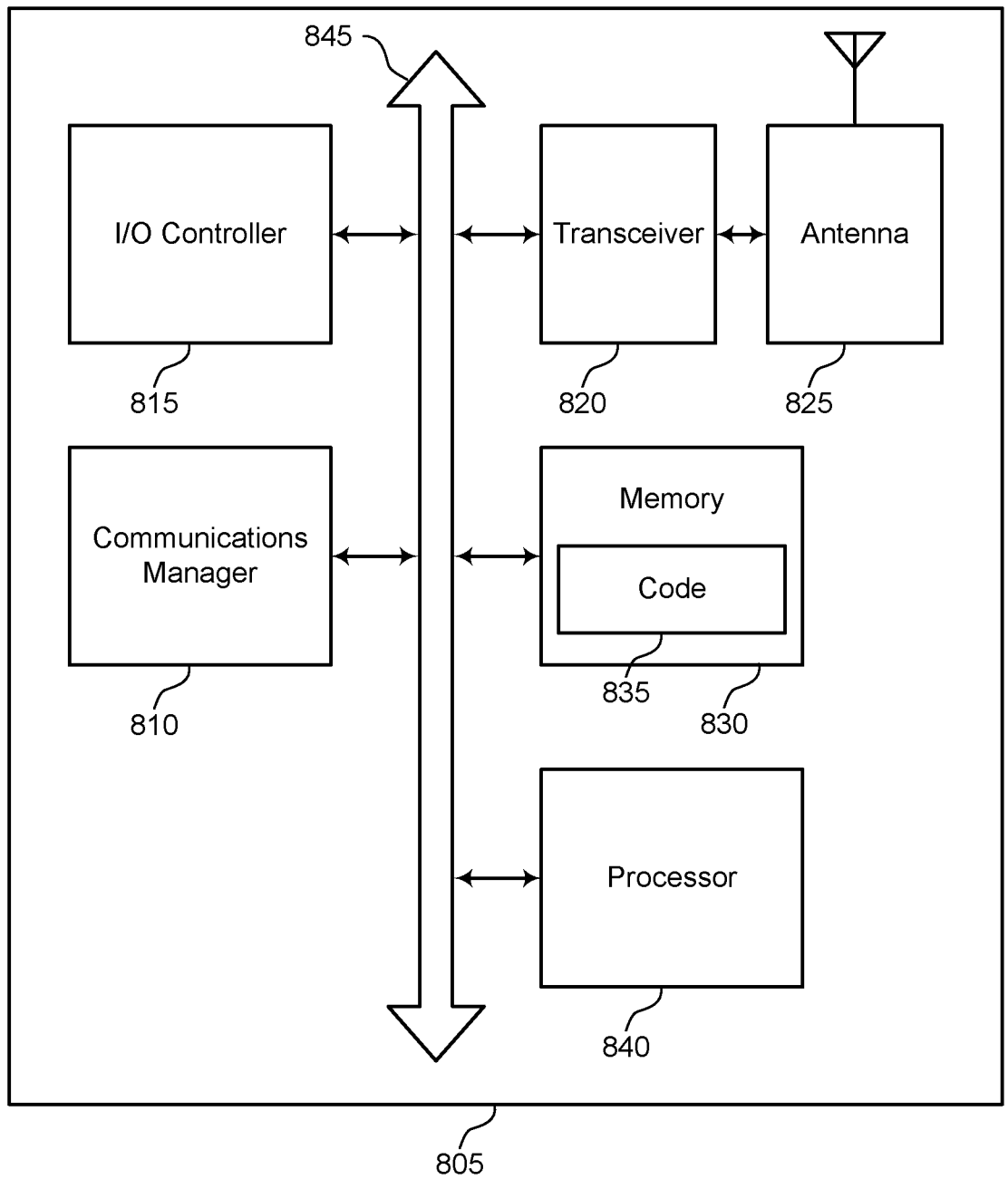
FIG. 8 shows a diagram of a system including a device that supports antenna panel selection for interference mitigation at a multi-panel device in accordance with aspects of the present disclosure.

FIG. 8 shows a diagram of a system including a device 805 that supports antenna panel selection for interference mitigation at a multi-panel device in accordance with aspects of the present disclosure. The device 805 may be an example of or include the components of device 505, device 605, a UE 115, a base station 105, or any other multi-panel device. The device 805 may include components for bi-directional voice and data communications including components for transmitting and receiving communications, including a communications manager 810, an input/output (I/O) controller 815, a transceiver 820, an antenna 825, memory 830, a processor 840, and a coding manager 850. These components may be in electronic communication via one or more buses (for example, bus 845).

The communications manager 810 may determine a carrier frequency dependent multi-panel configuration associated with at least a first antenna panel and a second antenna panel, determine a first coverage region associated with the first antenna panel and a second coverage region associated with the second antenna panel based on a first grating lobe of a first array gain pattern of the first antenna panel and a second grating lobe of a second array gain pattern of the second antenna panel, the first grating lobe different than a main lobe of the first array gain pattern and the second grating lobe different than a main lobe of the second array gain pattern, and communicate with a second device using one of the first antenna panel or the second antenna panel based at least in part on a location of the second device being in the first coverage region associated with the first antenna panel or the second coverage region associated with the second antenna panel.

The I/O controller 815 may manage input and output signals for the device 805. The I/O controller 815 may also manage peripherals not integrated into the device 805. In some examples, the I/O controller 815 may represent a physical connection or port to an external peripheral. In some examples, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some examples, the I/O controller 815 may be implemented as part of a processor. In some examples, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some examples, the wireless device may include a single antenna 825. In some other examples, the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, if executed, cause the processor to perform various functions described herein. In some examples, the memory 830 may contain, among other things, a basic I/O system (BIOS), which may control basic hardware or software operation such as the interaction with peripheral components or devices.

The processor 840 may include an intelligent hardware device, (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some examples, the processor 840 may be configured to operate a memory array using a memory controller. In other cases, a memory controller may be integrated into the processor 840. The processor 840 may be configured to execute computer-readable instructions stored in a memory (for example, the memory 830) to cause the device 805 to perform various functions (for example, functions or tasks supporting antenna panel selection for interference mitigation and power and thermal management at a multi-panel device).

The code 835 may include instructions to implement aspects of the present disclosure, including instructions to support wireless communications. The code 835 may be stored in a non-transitory computer-readable medium such as system memory or other type of memory. In some examples, the code 835 may not be directly executable by the processor 840 but may cause a computer (for example, if compiled and executed) to perform functions described herein.

Figure 9:
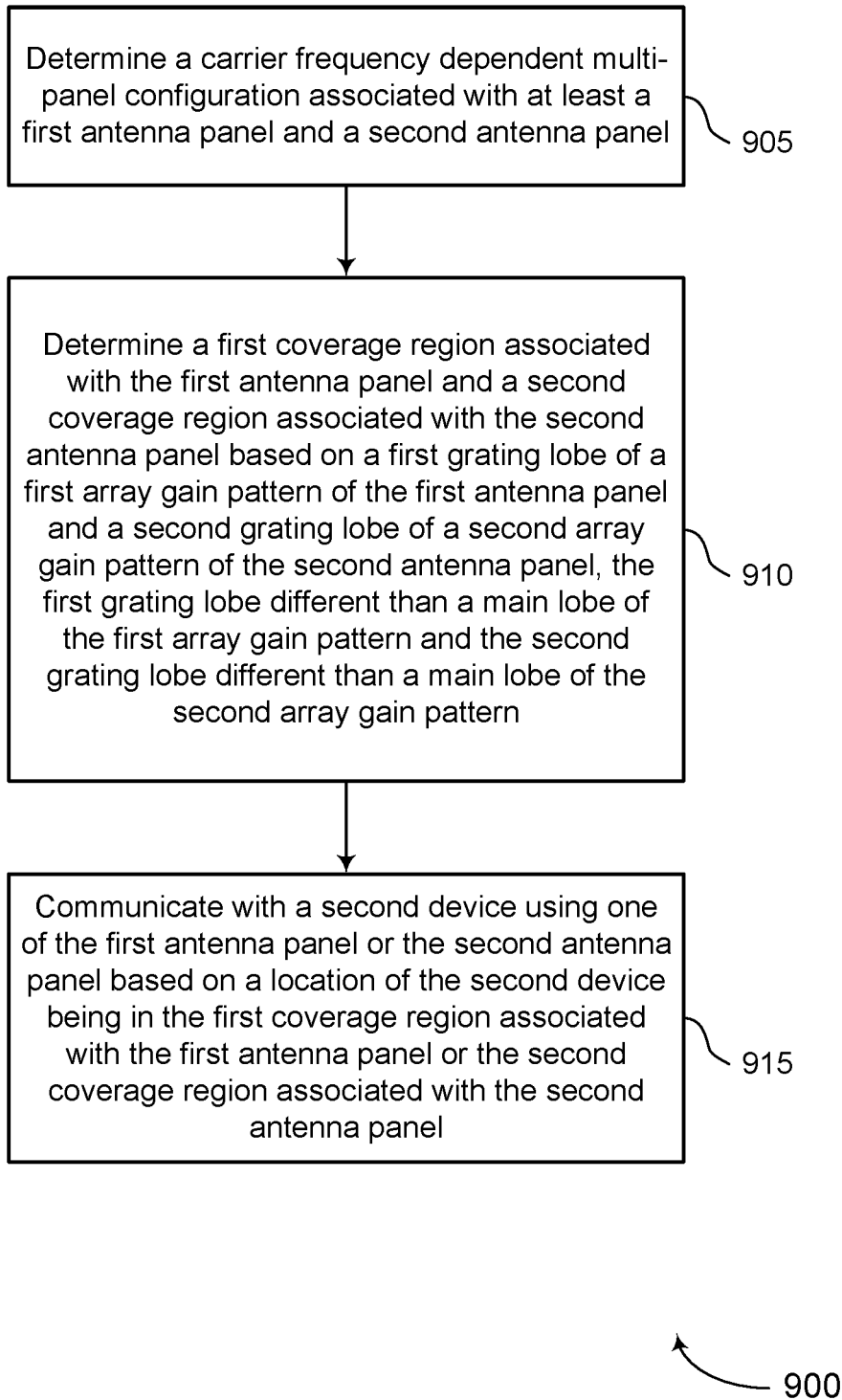
FIGS. 9 and 10 show flowcharts illustrating methods that support antenna panel selection for interference mitigation at a multi-panel device in accordance with aspects of the present disclosure.

FIG. 9 shows a flowchart illustrating a method 900 that supports antenna panel selection for interference mitigation at a multi-panel device in accordance with aspects of the present disclosure. The operations of method 900 may be implemented by a device or its components. For example, the operations of method 900 may be performed by a communications manager as described with reference to FIGS. 5-8. In some examples, a device may execute a set of instructions to control the functional elements of the device to perform the functions described herein. Additionally or alternatively, a device may perform aspects of the functions described herein using special-purpose hardware.

At 905, the device may determine a carrier frequency dependent multi-panel configuration associated with at least a first antenna panel and a second antenna panel. The operations of 905 may be performed according to the methods described herein. In some examples, aspects of the operations of 905 may be performed by an antenna panel configuration component as described with reference to FIGS. 5-8.

At 910, the device may determine a first coverage region associated with the first antenna panel and a second coverage region associated with the second antenna panel based on a first grating lobe of a first array gain pattern of the first antenna panel and a second grating lobe of a second array gain pattern of the second antenna panel, the first grating lobe different than a main lobe of the first array gain pattern and the second grating lobe different than a main lobe of the second array gain pattern. The operations of 910 may be performed according to the methods described herein. In some examples, aspects of the operations of 910 may be performed by an antenna panel coverage component as described with reference to FIGS. 5-8.

At 915, the device may communicate with a second device using one of the first antenna panel or the second antenna panel based on a location of the second device being in the first coverage region associated with the first antenna panel or the second coverage region associated with the second antenna panel. The operations of 915 may be performed according to the methods described herein. In some examples, aspects of the operations of 915 may be performed by an antenna panel coverage component as described with reference to FIGS. 5-8.

Figure 10:
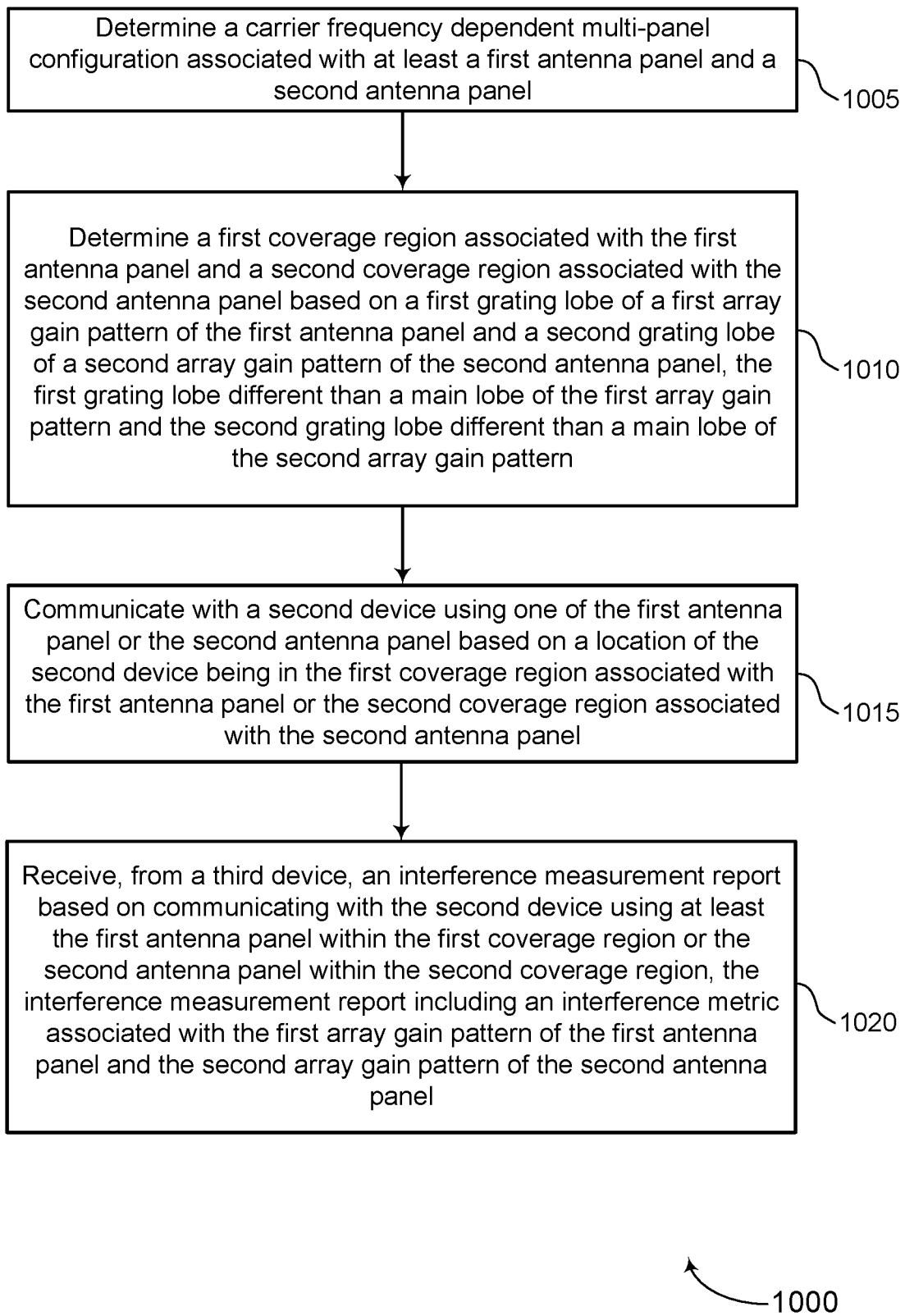

FIG. 10 shows a flowchart illustrating a method 1000 that supports antenna panel selection for interference mitigation at a multi-panel device in accordance with aspects of the present disclosure. The operations of method 1000 may be implemented by a device or its components. For example, the operations of method 1000 may be performed by a communications manager as described with reference to FIGS. 5-8. In some examples, a device may execute a set of instructions to control the functional elements of the device to perform the functions described herein. Additionally or alternatively, a device may perform aspects of the functions described herein using special-purpose hardware.

At 1005, the device may determine a carrier frequency dependent multi-panel configuration associated with at least a first antenna panel and a second antenna panel. The operations of 1005 may be performed according to the methods described herein. In some examples, aspects of the operations of 1005 may be performed by an antenna panel configuration component as described with reference to FIGS. 5-8.

At 1010, the device may determine a first coverage region associated with the first antenna panel and a second coverage region associated with the second antenna panel based on a first grating lobe of a first array gain pattern of the first antenna panel and a second grating lobe of a second array gain pattern of the second antenna panel, the first grating lobe different than a main lobe of the first array gain pattern and the second grating lobe different than a main lobe of the second array gain pattern. The operations of 1010 may be performed according to the methods described herein. In some examples, aspects of the operations of 1010 may be performed by an antenna panel coverage component as described with reference to FIGS. 5-8.

At 1015, the device may communicate with a second device using one of the first antenna panel or the second antenna panel based on a location of the second device being in the first coverage region associated with the first antenna panel or the second coverage region associated with the second antenna panel. The operations of 1015 may be performed according to the methods described herein. In some examples, aspects of the operations of 1015 may be performed by an antenna panel coverage component as described with reference to FIGS. 5-8.

At 1020, the device may receive, from a third device, an interference measurement report based on communicating with the second device using at least the first antenna panel within the first coverage region or the second antenna panel within the second coverage region, the interference measurement report including an interference metric associated with the first array gain pattern of the first antenna panel and the second array gain pattern of the second antenna panel. The operations of 1020 may be performed according to the methods described herein. In some examples, aspects of the operations of 1020 may be performed by an interference measurement component as described with reference to FIGS. 5-8.

The following provides an overview of aspects of the present disclosure:

Aspect 1: A method for wireless communication at a first device, comprising: determining a carrier frequency dependent multi-panel configuration associated with at least a first antenna panel and a second antenna panel; determining a first coverage region associated with the first antenna panel and a second coverage region associated with the second antenna panel based at least in part on a first grating lobe of a first array gain pattern of the first antenna panel and a second grating lobe of a second array gain pattern of the second antenna panel, the first grating lobe different than a main lobe of the first array gain pattern and the second grating lobe different than a main lobe of the second array gain pattern; and communicating with a second device using one of the first antenna panel or the second antenna panel based at least in part on a location of the second device being in the first coverage region associated with the first antenna panel or the second coverage region associated with the second antenna panel.

Aspect 2: The method of aspect 1, further comprising receiving, from a third device, an interference measurement report based at least in part on communicating with the second device using at least the first antenna panel within the first coverage region or the second antenna panel within the second coverage region, the interference measurement report comprising an interference metric associated with the first array gain pattern of the first antenna panel and the second array gain pattern of the second antenna panel.

Aspect 3: The method of aspect 2, further comprising: determining that the interference metric fails to satisfy a threshold; determining a third coverage region associated with the first antenna panel and a fourth coverage region associated with the second antenna panel based at least in part on determining that the interference metric fails to satisfy the threshold, the third coverage region different than the first coverage region and the fourth coverage region different than the second coverage region; and communicating with the second device using one of the first antenna panel or the second antenna panel based at least in part on the location of the second device being in the third coverage region associated with the first antenna panel or the fourth coverage region associated with the second antenna panel.

Aspect 4: The method of any of aspects 2 or 3, further comprising transmitting, to the third device, a message triggering the interference measurement report, wherein receiving the interference measurement report is based at least in part on transmitting the message.

Aspect 5: The method of any of aspects 2-4, further comprising transmitting, to the third device, an acknowledgement of receiving the interference measurement report.

Aspect 6: The method of any of aspects 2-5, wherein the interference metric is based at least in part on an interference arising from the main lobe of the first array gain pattern, the first grating lobe of the first array gain pattern, the main lobe of the second array gain pattern, or the second grating lobe of the second array gain pattern.

Aspect 7: The method of any of aspects 1-6, wherein determining the first coverage region associated with the first antenna panel and the second coverage region associated with the second antenna panel comprises: determining a first angular range over which the first device can communicate using the first antenna panel based at least in part on the first array gain pattern of the first antenna panel, wherein the first coverage region comprises the first angular range; and determining a second angular range over which the first device can communicate using the second antenna panel based at least in part on the second array gain pattern of the second antenna panel, wherein the second coverage region comprises the second angular range.

Aspect 8: The method of aspect 7, wherein communicating with the second device comprises: determining that an angular direction associated with the second device is located within the first angular range associated with the first antenna panel; and communicating with the second device using the first antenna panel.

Aspect 9: The method of aspect 7, wherein communicating with the second device comprises: determining that an angular direction associated with the second device is located within the second angular range associated with the second antenna panel; and communicating with the second device using the second antenna panel.

Aspect 10: The method of any of aspects 7-9, wherein the first angular range associated with the first antenna panel is associated with a first portion of the first array gain pattern of the first antenna panel, the first portion of the first array gain pattern excluding the first grating lobe of the first array gain pattern; and the second angular range associated with the second antenna panel is associated with a second portion of the second array gain pattern of the second antenna panel, the second portion of the second array gain pattern excluding the second grating lobe of the second array gain pattern.

Aspect 11: The method of any of aspects 1-10, wherein determining the first coverage region associated with the first antenna panel and the second coverage region associated with the second antenna panel is based at least in part on a power constraint or a thermal constraint of the first device.

Aspect 12: The method of any of aspects 1-11, wherein the first device uses a first quantity of antenna elements associated with the first antenna panel and a second quantity of antenna elements associated with the second antenna panel based at least in part on determining the first coverage region associated with the first antenna panel and the second coverage region associated with the second antenna panel, the first quantity being different than the second quantity.

Aspect 13: The method of any of aspects 1-12, further comprising determining that a first array gain of the main lobe of the first array gain pattern is greater than a second array gain of the main lobe of the second array gain pattern, wherein determining the first coverage region associated with the first antenna panel and the second coverage region associated with the second antenna panel is based at least in part on determining that the first array gain of the main lobe of the first array gain pattern is greater than the second array gain of the main lobe of the second array gain pattern.

Aspect 14: The method of any of aspects 1-13, further comprising: transmitting, to the second device or a third device, information associated with the first array gain pattern of the first antenna panel and the second array gain pattern of the second antenna panel; and receiving, from the second device or the third device, an indication of the carrier frequency dependent multi-panel configuration associated with at least the first antenna panel and the second antenna panel based at least in part on transmitting the information, wherein determining the carrier frequency dependent multi-panel configuration is based at least in part on receiving the indication of the carrier frequency dependent multi-panel configuration.

Aspect 15: The method of any of aspects 1-14, wherein the first array gain pattern and the second array gain pattern are associated with an analog beamforming codebook usable for ultra-wide bandwidth operation at the first device with an operating frequency greater than 24.25 GHz.

Aspect 16: An apparatus for wireless communication at a first device, comprising a processor; memory coupled with the processor; and instructions stored in the memory and executable by the processor to cause the apparatus to perform a method of any of aspects 1-15.

Aspect 17: An apparatus for wireless communication at a first device, comprising at least one means for performing a method of any of aspects 1-15.

Aspect 18: A non-transitory computer-readable medium storing code for wireless communication at a first device, the code comprising instructions executable by a processor to perform a method of any of aspects 1-15.

It is noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

As used herein, the term "determine" or "determining" encompasses a wide variety of actions and "determining" can include calculating, computing, processing, deriving, investigating, looking up (such as via looking up in a table, a database or another data structure), or ascertaining. Also, "determining" can include receiving (such as receiving information) or accessing (such as accessing data in a memory). Also, "determining" can include resolving, selecting, choosing, establishing and other such similar actions.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. The disclosure is not limited to the examples and designs described herein, but is to be accorded the broadest scope consistent with the principles and novel features disclosed herein.

What is claimed is:

1. A method for wireless communication at a first device, comprising:

determining a first coverage region associated with a first antenna panel and a second coverage region associated with a second antenna panel in accordance with a carrier frequency dependent multi-panel configuration associated with at least the first antenna panel and the second antenna panel, wherein determining the first coverage region and the second coverage region comprises:

determining a first angular range over which the first device can communicate using the first antenna panel in accordance with a first grating lobe of a first array gain pattern of the first antenna panel, the first grating lobe different than a main lobe of the first array gain pattern, wherein the first coverage region comprises the first angular range; and determining a second angular range over which the first device can communicate using the second antenna panel in accordance with a second grating lobe of a second array gain pattern of the second antenna panel, the second grating lobe different than a main lobe of the second array gain pattern, wherein the second coverage region comprises the second angular range; and communicating with a second device using one of the first antenna panel or the second antenna panel in accordance with a location of the second device being in the first coverage region associated with the first antenna panel or the second coverage region associated with the second antenna panel.

2. The method of claim 1, further comprising receiving, from a third device, an interference measurement report in accordance with communicating with the second device using at least the first antenna panel within the first coverage region or the second antenna panel within the second coverage region, the interference measurement report comprising an interference metric associated with the first array gain pattern of the first antenna panel and the second array gain pattern of the second antenna panel.

3. The method of claim 2, further comprising:
determining that the interference metric fails to satisfy a threshold;
determining a third coverage region associated with the first antenna panel and a fourth coverage region associated with the second antenna panel in accordance with determining that the interference metric fails to satisfy the threshold, the third coverage region different than the first coverage region and the fourth coverage region different than the second coverage region; and
communicating with the second device using one of the first antenna panel or the second antenna panel in accordance with the location of the second device being in the third coverage region associated with the first antenna panel or the fourth coverage region associated with the second antenna panel.

4. The method of claim 2, further comprising transmitting, to the third device, a message triggering the interference measurement report, wherein receiving the interference measurement report is in accordance with transmitting the message.

5. The method of claim 2, further comprising transmitting, to the third device, an acknowledgement of receiving the interference measurement report.

6. The method of claim 2, wherein the interference metric is associated with an interference arising from the main lobe of the first array gain pattern, the first grating lobe of the first array gain pattern, the main lobe of the second array gain pattern, or the second grating lobe of the second array gain pattern.

7. The method of claim 1, wherein communicating with the second device comprises:
determining that an angular direction associated with the second device is located within the first angular range associated with the first antenna panel; and
communicating with the second device using the first antenna panel.

8. The method of claim 1, wherein communicating with the second device comprises:
determining that an angular direction associated with the second device is located within the second angular range associated with the second antenna panel; and
communicating with the second device using the second antenna panel.

9. The method of claim 1, wherein:
the first angular range associated with the first antenna panel is associated with a first portion of the first array gain pattern of the first antenna panel, the first portion of the first array gain pattern excluding the first grating lobe of the first array gain pattern; and
the second angular range associated with the second antenna panel is associated with a second portion of the second array gain pattern of the second antenna panel, the second portion of the second array gain pattern excluding the second grating lobe of the second array gain pattern.

10. The method of claim 1, wherein determining the first coverage region associated with the first antenna panel and the second coverage region associated with the second antenna panel is in accordance with a power constraint or a thermal constraint of the first device.

11. The method of claim 1, wherein the first device uses a first quantity of antenna elements associated with the first antenna panel and a second quantity of antenna elements associated with the second antenna panel in accordance with determining the first coverage region associated with the first antenna panel and the second coverage region associated with the second antenna panel, the first quantity being different than the second quantity.

12. The method of claim 1, further comprising determining that a first array gain of the main lobe of the first array gain pattern is greater than a second array gain of the main lobe of the second array gain pattern, wherein determining the first coverage region associated with the first antenna panel and the second coverage region associated with the second antenna panel is in accordance with determining that the first array gain of the main lobe of the first array gain pattern is greater than the second array gain of the main lobe of the second array gain pattern.

13. The method of claim 1, further comprising:
transmitting, to the second device or a third device, information associated with the first array gain pattern of the first antenna panel and the second array gain pattern of the second antenna panel; and
receiving, from the second device or the third device, an indication of the carrier frequency dependent multi-panel configuration associated with at least the first antenna panel and the second antenna panel in accordance with transmitting the information.

14. The method of claim 1, wherein the first array gain pattern and the second array gain pattern are associated with an analog beamforming codebook usable for ultra-wide bandwidth operation at the first device with an operating frequency greater than 24.25 GHz.

15. An apparatus for wireless communication at a first device, comprising:
a processor,
memory coupled with the processor; and
instructions stored in the memory and executable by the processor to cause the apparatus to:
determine a first coverage region associated with a first antenna panel and a second coverage region associated with a second antenna panel in accordance with a carrier frequency dependent multi-panel configuration associated with at least the first antenna panel and the second antenna panel, wherein, to determine the first coverage region and the second coverage region, the instructions are further executable by the processor to cause the apparatus to:
determine a first angular range over which the first device can communicate using the first antenna panel in accordance with a first grating lobe of a first array gain pattern of the first antenna panel, the first grating lobe different than a main lobe of the first array gain pattern, wherein the first coverage region comprises the first angular range; and
determine a second angular range over which the first device can communicate using the second antenna panel in accordance with a second grating lobe of a second array gain pattern of the second antenna panel, the second grating lobe different than a main lobe of the second array gain pattern, wherein the second coverage region comprises the second angular range; and communicate with a second device using one of the first antenna panel or the second antenna panel in accordance with a location of the second device being in the first coverage region associated with the first antenna panel or the second coverage region associated with the second antenna panel.

16. The apparatus of claim 15, wherein the instructions are further executable by the processor to cause the apparatus to receive, from a third device, an interference measurement report in accordance with communicating with the second device using at least the first antenna panel within the first coverage region or the second antenna panel within the second coverage region, the interference measurement report comprising an interference metric associated with the first array gain pattern of the first antenna panel and the second array gain pattern of the second antenna panel.

17. The apparatus of claim 16, wherein the instructions are further executable by the processor to cause the apparatus to:

determine that the interference metric fails to satisfy a threshold;

determine a third coverage region associated with the first antenna panel and a fourth coverage region associated with the second antenna panel in accordance with determining that the interference metric fails to satisfy the threshold, the third coverage region different than the first coverage region and the fourth coverage region different than the second coverage region; and communicate with the second device using one of the first antenna panel or the second antenna panel in accordance with the location of the second device being in the third coverage region associated with the first antenna panel or the fourth coverage region associated with the second antenna panel.

18. The apparatus of claim 16, wherein the instructions are further executable by the processor to cause the apparatus to transmit, to the third device, a message triggering the interference measurement report, wherein receiving the interference measurement report is in accordance with transmitting the message.

19. The apparatus of claim 16, wherein the instructions are further executable by the processor to cause the apparatus to transmit, to the third device, an acknowledgement of receiving the interference measurement report.

20. The apparatus of claim 16, wherein the interference metric is associated with an interference arising from the main lobe of the first array gain pattern, the first grating lobe of the first array gain pattern, the main lobe of the second array gain pattern, or the second grating lobe of the second array gain pattern.

21. The apparatus of claim 15, wherein the instructions to communicate with the second device are executable by the processor to cause the apparatus to:

determine that an angular direction associated with the second device is located within the first angular range associated with the first antenna panel; and communicate with the second device using the first antenna panel.

22. The apparatus of claim 15, wherein the instructions to communicate with the second device are executable by the processor to cause the apparatus to:

determine that an angular direction associated with the second device is located within the second angular range associated with the second antenna panel; and communicate with the second device using the second antenna panel.

23. The apparatus of claim 15, wherein:

the first angular range associated with the first antenna panel is associated with a first portion of the first array gain pattern of the first antenna panel, the first portion of the first array gain pattern excluding the first grating lobe of the first array gain pattern; and the second angular range associated with the second antenna panel is associated with a second portion of the second array gain pattern of the second antenna panel, the second portion of the second array gain pattern excluding the second grating lobe of the second array gain pattern.

24. The apparatus of claim 15, wherein determining the first coverage region associated with the first antenna panel and the second coverage region associated with the second antenna panel is in accordance with a power constraint or a thermal constraint of the first device.

25. The apparatus of claim 15, wherein the first device uses a first quantity of antenna elements associated with the first antenna panel and a second quantity of antenna elements associated with the second antenna panel in accordance with determining the first coverage region associated with the first antenna panel and the second coverage region associated with the second antenna panel, the first quantity being different than the second quantity.

26. The apparatus of claim 15, wherein the instructions are further executable by the processor to cause the apparatus to determine that a first array gain of the main lobe of the first array gain pattern is greater than a second array gain of the main lobe of the second array gain pattern, wherein determining the first coverage region associated with the first antenna panel and the second coverage region associated with the second antenna panel is in accordance with determining that the first array gain of the main lobe of the first array gain pattern is greater than the second array gain of the main lobe of the second array gain pattern.

27. An apparatus for wireless communication at a first device, comprising:

means for determining a first coverage region associated with a first antenna panel and a second coverage region associated with a second antenna panel in accordance with a carrier frequency dependent multi-panel configuration associated with at least the first antenna panel and the second antenna panel, wherein the means for determining the first coverage region and the second coverage region comprises:

means for determining a first angular range over which the first device can communicate using the first antenna panel in accordance with a first grating lobe of a first array gain pattern of the first antenna panel, the first grating lobe different than a main lobe of the first array gain pattern, wherein the first coverage region comprises the first angular range;

means for determining a second angular range over which the first device can communicate using the second antenna panel in accordance with a second grating lobe of a second array gain pattern of the second antenna panel, the second grating lobe different than a main lobe of the second array gain pattern, wherein the second coverage region comprises the second angular range; and means for communicating with a second device using one of the first antenna panel or the second antenna panel in accordance with a location of the second device being in the first coverage region associated with the first antenna panel or the second coverage region associated with the second antenna panel.

28. A non-transitory computer-readable medium storing code for wireless communication at a first device, the code comprising instructions executable by a processor to:

determine a first coverage region associated with a first antenna panel and a second coverage region associated with a second antenna panel in accordance with a carrier frequency dependent multi-panel configuration associated with at least the first antenna panel and the second antenna panel, wherein, to determine the first coverage region and the second coverage region, the instructions are further executable by the processor to:

determine a first angular range over which the first device can communicate using the first antenna panel in accordance with a first grating lobe of a first array gain pattern of the first antenna panel, the first grating lobe different than a main lobe of the first array gain pattern, wherein the first coverage region comprises the first angular range; and determine a second angular range over which the first device can communicate using the second antenna panel in accordance with a second grating lobe of a second array gain pattern of the second antenna panel, the second grating lobe different than a main lobe of the second array gain pattern, wherein the second coverage region comprises the second angular range; and communicate with a second device using one of the first antenna panel or the second antenna panel in accordance with a location of the second device being in the first coverage region associated with the first antenna panel or the second coverage region associated with the second antenna panel.

* * * * *